United States Patent
Ward et al.

(10) Patent No.: US 9,269,068 B2
(45) Date of Patent: Feb. 23, 2016

(54) SYSTEMS AND METHODS FOR CONSUMER-GENERATED MEDIA REPUTATION MANAGEMENT

(75) Inventors: Miles Ward, Des Moines, WA (US);
James Webber, Puyallup, WA (US);
Dean M. Graziano, Mill Creek, WA (US)

(73) Assignee: VISIBLE TECHNOLOGIES LLC, Bellevue, WA (US)

( * ) Notice: Subject to any disclaimer, the term of this patent is extended or adjusted under 35 U.S.C. 154(b) by 667 days.

(21) Appl. No.: 12/580,667

(22) Filed: Oct. 16, 2009

(65) Prior Publication Data

US 2010/0275128 A1    Oct. 28, 2010

Related U.S. Application Data

(63) Continuation-in-part of application No. 12/251,370, filed on Oct. 14, 2008, now abandoned, and a continuation-in-part of application No. PCT/US2008/079885, filed on Oct. 14, 2008, and a (Continued)

(51) Int. Cl.
*G06F 3/048* (2013.01)
*G06Q 10/10* (2012.01)

(Continued)

(52) U.S. Cl.
CPC .............. *G06Q 10/10* (2013.01); *G06Q 10/06* (2013.01); *G06Q 30/02* (2013.01)

(58) Field of Classification Search
USPC ................................... 715/751, 744; 705/35
See application file for complete search history.

(56) References Cited

U.S. PATENT DOCUMENTS 6,208,988 B1    3/2001    Schultz
6,515,681 B1 *  2/2003    Knight ................. 715/751

(Continued)

FOREIGN PATENT DOCUMENTS

KR    10-2007-0021640    8/2005
WO        01/93155 A2    12/2001
WO    2006/019282 A1    2/2006

OTHER PUBLICATIONS

Golgher et al. An Example-Based Environment from Wrapper Generation Proceedings of the Workshop on Conceptual Modeling Approaches for E-Business and the World Wide Web and its Conceptual Modeling: Conceptual Modeling for E-Business on the Web; Oct. 2000, pp. 152-164.

(Continued)

*Primary Examiner* — William Trapanese
(74) *Attorney, Agent, or Firm* — P. G. Scott Born; Richard T. Black; Foster Pepper PLLC

(57) ABSTRACT

Methods and systems for monitoring consumer generated media are disclosed herein. Consumer generated media (CGM) is discovered using a plurality of keywords from a set of keywords configured to return consumer generated media embedded in a digital location. CGM is collected from a plurality of sources using a plurality of robots configured to collect media from the discovered CGM. CGM is normalized for statistical analysis. CGM is tested for conceptual relevance to the predetermined topic using the series of keywords. Sentiment is determined of the collected consumer generated media based on the semantics of the language in the collected CGM. A graphical user interface is generated having collected consumer generated media and statistical information related to at least one of the conceptual relevance and the determined sentiment. The graphical user interface is displayed and a reply is enabled to at least one of the collected consumer generated media, displayed within the graphical user interface, such that when selected a reply is posted to the source of the CGM.

18 Claims, 19 Drawing Sheets

Related U.S. Application Data continuation-in-part of application No. 12/192,919, filed on Aug. 15, 2008, now abandoned, and a continuation-in-part of application No. PCT/US2008/073401, filed on Aug. 15, 2008, and a continuation-in-part of application No. 11/745,390, filed on May 7, 2007, now Pat. No. 7,720,835, and a continuation-in-part of application No. PCT/US2007/068392, filed on May 7, 2007.

(60) Provisional application No. 61/106,134, filed on Oct. 16, 2008, provisional application No. 61/147,057, filed on Jan. 23, 2009, provisional application No. 61/241,132, filed on Sep. 10, 2009, provisional application No. 61/003,144, filed on Nov. 13, 2007, provisional application No. 60/998,730, filed on Oct. 11, 2007, provisional application No. 61/072,776, filed on Apr. 1, 2008, provisional application No. 61/126,061, filed on Apr. 29, 2008, provisional application No. 60/965,067, filed on Aug. 15, 2007, provisional application No. 60/956,097, filed on Aug. 15, 2007, provisional application No. 60/746,621, filed on May 5, 2006, provisional application No. 60/861,406, filed on Nov. 27, 2006, provisional application No. 60/903,810, filed on Feb. 26, 2007.

(51) Int. Cl.
*G06Q 10/06* (2012.01)
*G06Q 30/02* (2012.01)

(56) References Cited

U.S. PATENT DOCUMENTS

| | | | |
|---|---|---|---|
| 7,185,065 B1 * | 2/2007 | Holtzman et al. | 709/217 |
| 7,188,078 B2 | 3/2007 | Arnett et al. | |
| 7,188,079 B2 | 3/2007 | Arnett et al. | |
| 2001/0047294 A1 * | 11/2001 | Rothschild | 705/14 |
| 2002/0038217 A1 | 3/2002 | Young | |
| 2002/0062368 A1 | 5/2002 | Holtzman et al. | |
| 2002/0107726 A1 | 8/2002 | Torrance et al. | |
| 2004/0078365 A1 | 4/2004 | Poltorak | |
| 2004/0172415 A1 * | 9/2004 | Messina et al. | 707/104.1 |
| 2004/0254904 A1 | 12/2004 | Nelken et al. | |
| 2005/0160107 A1 | 7/2005 | Liang | |
| 2005/0182768 A1 | 8/2005 | Waldorf et al. | |
| 2005/0273503 A1 | 12/2005 | Carr et al. | |
| 2006/0004716 A1 | 1/2006 | Hurst-Hiller et al. | |
| 2006/0004914 A1 | 1/2006 | Kelly et al. | |
| 2006/0041597 A1 | 2/2006 | Conrad et al. | |
| 2006/0069589 A1 * | 3/2006 | Nigam et al. | 705/1 |
| 2006/0075141 A1 | 4/2006 | Boxenhorn et al. | |
| 2006/0085248 A1 | 4/2006 | Arnett et al. | |
| 2006/0115108 A1 | 6/2006 | Rodriguez et al. | |
| 2006/0195461 A1 | 8/2006 | Lo et al. | |
| 2006/0218179 A1 * | 9/2006 | Gardner et al. | 707/102 |
| 2006/0242040 A1 * | 10/2006 | Rader | 705/35 |
| 2006/0284873 A1 | 12/2006 | Forrest et al. | |
| 2006/0287989 A1 | 12/2006 | Glance | |
| 2007/0027932 A1 | 2/2007 | Thibeault | |
| 2007/0043617 A1 | 2/2007 | Stein et al. | |
| 2007/0050389 A1 | 3/2007 | Kim et al. | |
| 2007/0055612 A1 | 3/2007 | Palestrant et al. | |
| 2007/0100875 A1 | 5/2007 | Chi et al. | |
| 2007/0136234 A1 * | 6/2007 | Levin et al. | 707/2 |
| 2007/0198459 A1 * | 8/2007 | Boone et al. | 707/1 |

OTHER PUBLICATIONS

Oppermann BlogDesk Help, retrieved from Internet. http://www.blogdesk.org/en/blogdesk-help.pdf, archived at archive.org on Mar. 21, 2006, pp. 1-31.

* cited by examiner

Mid-Term Automated Analysis Overview

Mature Automated Analysis Overview

FIG.13

Scheduled Data Export (XML)

A scheduled export saves all new post data (including post body) at a regular interval. The data is saved in xml format and compressed for fast downloading (GZP)

o Schedule

▸ Change Schedule

Weekly Export on Wednesdays

| # | Exported Date | Status | Date to be Included |
|---|---|---|---|
| 11 | 30 Sep 09 | Scheduled | 23 Sep 09 – 30 Sep 09 | o Completed Exports

| # | Exported Date | Status | Date Included | Posts | File Size | Download |
|---|---|---|---|---|---|---|
| 9 | 16 sep 09 5:00am | Completed | 09 Sep 09 – 16 Sep 09 | 3,276 | 2 MB | Download |
| 8 | 09 Sep 09 5:00am | Completed | 02 Sep 09 – 09 Sep 09 | 3,623 | 2 MB | Download |
| 7 | 02 Sep 09 5:00am | Completed | 26 Aug 09 – 02 Sep –09 | 4,674 | 2 MB | Download |
| 6 | 26 Aug 09 5:00am | Completed | 19 Aug 09 – 26 Aug 09 | 4,781 | 2 MB | Download |
| 5 | 19 Aug 09 5:00 am | Completed | 12 Aug 09 – 19 Aug 09 | 4,491 | 2 MB | Download |
| 4 | 12 Aug 09 5:00am | Completed | 05 Aug 09 – 12 Aug 09 | 3,469 | 2 MB | Download |
| 3 | 05 Aug 09 5:00am | Completed | 29 Jul 09 – 05 Aug 09 | 3,630 | 2 MB | Download |
| 2 | 29 Jul 09 5:00am | Completed | 22 Jul 09 – 29 Jul 09 | 2,987 | 1 MB | Download |

Files automatically expire after four weeks

FIG.17

SYSTEMS AND METHODS FOR CONSUMER-GENERATED MEDIA REPUTATION MANAGEMENT

PRIORITY CLAIM

This application claims priority to and the benefit of U.S. Provisional Application Ser. No. 61/106,134 filed Oct. 16, 2008, U.S. Provisional Application Ser. No. 61/147,057 filed Jan. 23, 2009, and U.S. Provisional Application Ser. No. 61/241,132 filed Sep. 14, 2009. Each of the foregoing applications are hereby incorporated by reference in their entirety as if fully set forth herein.

This application also a continuation-in-part of and claims priority to U.S. patent application Ser. No. 12/251,370 filed Oct. 14, 2008 and PCT Application Serial Number PCT/US08/79885 filed Oct. 14, 2008 both of which claim priority to and the benefit of U.S. Provisional Application Ser. No. 60/998,730 filed Oct. 11, 2007; U.S. Provisional Application Ser. No. 61/003,144 filed Nov. 13, 2007; U.S. Provisional Application Ser. No. 61/072,776 filed Apr. 1, 2008; and U.S. Patent Application Ser. No. 61/126,061 filed Apr. 29, 2008. This application also a continuation-in-part of and claims priority to U.S. patent application Ser. No. 12/192,919 filed Aug. 15, 2008 and PCT Application Serial Number PCT/US08/73401 filed Aug. 15, 2008 both of which claim priority to and the benefit of U.S. Provisional Application Ser. No. 60/965,067 filed Aug. 15, 2007 and U.S. Provisional Application Ser. No. 60/956,097 filed Aug. 15, 2007. This application is also a continuation-in-part of Ser. No. 11/745,390 filed May 7, 2007, and PCT Application Serial Number PCT/US07/68392 filed May 7, 2007 both of which claims priority to and the benefit of U.S. Provisional Application Ser. No. 60/746,621 filed May 5, 2006, U.S. Provisional Application Ser. No. 60/861,406 filed Nov. 27, 2006, and U.S. Provisional Application Ser. No. 60/903,810 filed Feb. 26, 2007. All of which are incorporated by reference in their entirety as if fully set forth herein.

COPYRIGHT NOTICE

This disclosure is protected under United States and International Copyright Laws. ©2005-2009 Visible Technologies. All Rights Reserved. A portion of the disclosure of this patent document contains material which is subject to copyright protection. The copyright owner has no objection to the facsimile reproduction by anyone of the patent document or the patent disclosure after formal publication by the USPTO, as it appears in the Patent and Trademark Office patent file or records, but otherwise reserves all copyright rights whatsoever.

BACKGROUND OF THE INVENTION

As used herein, the term "Consumer Generated Media" (hereinafter CGM) is a phrase that describes a wide variety of Internet web pages or sites, which are sometimes individually labeled as web logs or "blogs", mobile phone blogs or "moblogs", video hosting blogs or "vlogs" or "vblogs", forums, electronic discussion messages, Usenet, message boards, BBS emulating services, product review and discussion web sites, online retail sites that support customer comments, social networks, media repositories, audio and video sharing sites/networks and digital libraries. Private non-Internet information systems can host CGM content as well, via environments like Sharepoint, Wiki, Jira, CRM systems, ERP systems, and advertising systems. Other acronyms that describe this space are CCC (consumer created content), WSM (weblogs and social media), WOMM (Word of Mouth Media) or OWOM, (online word of mouth), and many others.

As used herein, the term "Keyphrase" refers to a word, string of words, or groups of words with Boolean modifiers that are used as models for discovering CGM content that might be relevant to a given topic. Could also be an example image, audio file or video file that has characteristics that would be used for content discovery and matching.

As used herein, the term "Post" refers to a single piece of CGM content. This might be a literal weblog posting, a comment, a forum reply, a product review, or any other single element of CGM content.

As used herein, the term "Site" refers to an Internet site which contains CGM content.

As used herein, the term "Blog" refers to an Internet site which contains CGM content.

As used herein, the term "Content" refers to media that resides on CGM sites. CGM is often text, but includes audio files and streams (podcasts, mp3, streamcasts, Internet radio, etc.) video files and streams, animations (flash, java) and other forms of multimedia.

As used herein, the term "UI" refers to a User Interface, that users interact with computer software, perform work, and review results.

As used herein, the term "IM" refers to an Instant Messenger, which is a class of software applications that allow direct text based communication between known peers.

As used herein, the term "Thread" refers to an "original" post and all of the comments connected to it, present on a blog or forum. A discussion thread holds the information of content display order, so this message came first, followed by this, followed by this.

As used herein, the term "Permalink" refers to a URL which persistently points to an individual CGM thread The Internet and other computer networks are communication systems. The sophistication of this communication has improved and the primary modes differentiated over time and technological progress. Each primary mode of online communication varies based on a combination of three basic values: privacy and persistence and control. Email as a communications medium is private (communications are initially exchanged only between named recipients), persistent (saved in inboxes or mail servers) but lacks control (once you send the message, you can't take it back, or edit it, or limit re-use of it). Instant messaging is private, typically not persistent (some newer clients are now allowing users to save history, so this mode is changing) and lacks control. Message boards are public (typically all members, and often all Internet users, can access your message) persistent, but lack control (they are typically moderated by a central owner of the board). Chat rooms are public (again, some are membership based) typically not persistent, and lack control.

|  | privacy | persistence | author control |
| --- | --- | --- | --- |
| Chat Rooms/IRC | no | no | no |
| Instant Messaging | yes | no | no |
| Forums | no | yes | no |
| Email | yes | yes | no |
| Blogs | no | yes | yes |
| social networks | yes/no | yes | yes |
| Second Life | yes | yes | yes+ |

Blogs and Social Networks are the predominant communications mediums that permit author control. By reducing the cost, technical sophistication, and experience required to create and administer a web site, blogs and other persistent online communication have given an unprecedented amount of editorial control to millions of online authors. This has created a unique new environment for creative expression, commentary, discourse, and criticism without the historical limits of editorial control, cost, technical expertise, or distribution/exposure.

There is significant value in the information contained within this public media. Because the opinions, topics of discussion, brands and celebrities mentioned and relationships evinced are typically totally unsolicited, the information presented, if well studied, represents an amazing new source of social insight, consumer feedback, opinion measurement, popularity analysis and messaging data. It also represents a fully exposed, granular network of peer and hierarchical relationships rich with authority and influence. The marketing, advertising, and PR value of this information is unprecedented.

This new medium represents a significant challenge for interested parties to comprehensively understand and interact with. As of Q1 2007 estimates for the number of active, unique online CGM sites (forums, blogs, social networks, etc.) range from 50 to 71 million, with growth rates in the hundreds of thousands of new sites per day. Compared to the typical mediums that PR, Advertising and Marketing businesses and divisions interact with (<1000 TV channels, <1000 radio stations, <1000 major news publications, <10-20 major pundits on any given subject, etc.) this represents a nearly 10,000-fold increase in the number of potential targets for interaction.

Businesses and other motivated communicators have come to depend on software that perform Business Intelligence, Customer Relationship Management, and Enterprise Resource Planning tasks to facilitate accelerated, organized, prioritized, tracked and analyzed interaction with customers and other target groups (voters, consumers, pundits, opinion leaders, analysts, reporters, etc.). These systems have been extended to facilitate IM, E-mail, and telephone interactions. These media have been successfully integrated because of standards (jabber, pop3, smtp, pots, imap) that require that all participant applications conform to a set data format that allows interaction with this data in a predictable way.

Blogs and other CGM generate business value for their owners, both on private sites that use custom or open source software to manage their communications, and for massive public hosts. Because these sites can generate advertising revenue, there is a drive by author/owners to protect the content on these sites, so readers/subscribers/peers have to visit the site, and become exposed to revenue generating advertising, in order to participate in/observe the communication. Because of this financial disincentive, there is no unifying standard for blogs which contain complete data. RSS and Atom feeds allow structured communication of some portion of the communication on sites, but are often very incomplete representations of the data available on a given site. Sites also protect their content from being "stolen" by automated systems with an array of CAPTCHAs, ("Completely Automated Public Turing test to tell Computers and Humans Apart") email verification, mobile phone text message verification, password authentication, cookie tracking, Uniform Resource Locator (URL) obfuscation, timeouts and Internet Protocol (IP) address tracking.

The result is a massively diverse community that it would be very valuable to understand and interact with, which resists aggregation and unified interaction by way of significant technical diversity, resistance to complete information data standards, and tests that attempt to require one-to-one human interaction with content.

SUMMARY OF THE INVENTION

Methods and systems for monitoring consumer generated media are disclosed herein. CGM is discovered using a plurality of keywords from a set of keywords configured to return consumer generated media embedded in a digital location. CGM is collected from a plurality of sources using a plurality of robots configured to collect media from the discovered CGM. CGM is normalized for statistical analysis. CGM is tested for conceptual relevance to the predetermined topic using the series of keywords. Sentiment is determined of the collected consumer generated media based on the semantics of the language in the collected CGM. A graphical user interface is generated having collected consumer generated media and statistical information related to at least one of the conceptual relevance and the determined sentiment. The graphical user interface is displayed and a reply is enabled to at least one of the collected consumer generated media, displayed within the graphical user interface, such that when selected a reply is posted to the source of the CGM.

BRIEF DESCRIPTION OF THE DRAWINGS

The preferred and alternative embodiments of the present invention are described in detail below with reference to the following drawings.

FIG. 13 shows a screenshot of a summary dashboard in one embodiment;

FIG. 17 shows a screenshot of data export in one embodiment; and

DETAILED DESCRIPTION OF THE PREFERRED EMBODIMENT

Figure 1A:
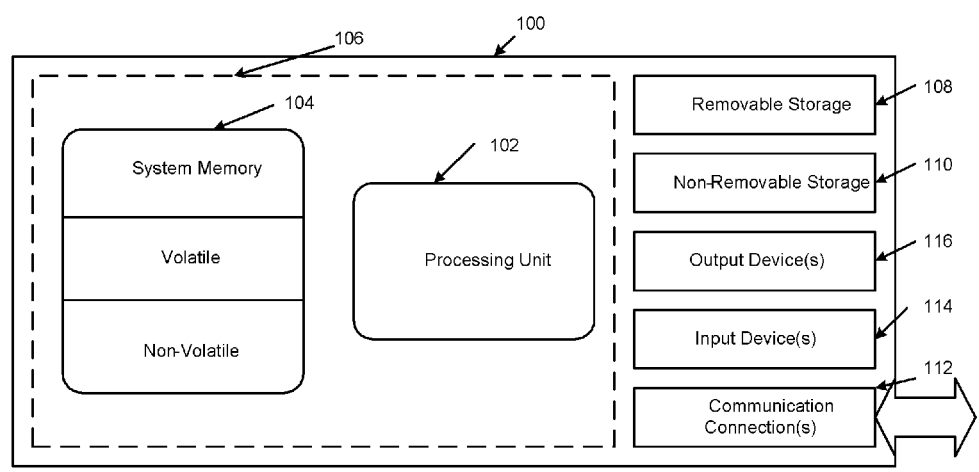
FIGS. 1A-1B shows an example system for consumer generated media reputation management; and, FIG. 2 shows a method for consumer generated media reputation management.

FIG. 1A illustrates an example of a suitable computing system environment 100 on which an embodiment of the invention may be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general-purpose or special-purpose computing-system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed-computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed-computing environment, program modules may be located in both local- and remote-computer storage media including memory storage devices.

With reference to FIG. 1A, an exemplary system for implementing an embodiment of the invention includes a computing device, such as computing device 100. In its most basic configuration, computing device 100 typically includes at least one processing unit 102 and memory 104.

Depending on the exact configuration and type of computing device, memory 104 may be volatile (such as random-access memory (RAM)), non-volatile (such as read-only memory (ROM), flash memory, etc.) or some combination of the two. This most basic configuration is illustrated in FIG. 1A by dashed line 106.

Additionally, device 100 may have additional features/functionality. For example, device 100 may also include additional storage (removable and/or non-removable) including, but not limited to, magnetic or optical disks or tape. Such additional storage is illustrated in FIG. 1A by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communications connection(s) 112 that allow the device to communicate with other devices. Communications connection(s) 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF), infrared and other wireless media. The term computer-readable media as used herein includes both storage media and communication media.

Device 100 may also have input device(s) 114 such as keyboard, mouse, pen, voice-input device, touch-input device, etc. Output device(s) 116 such as a display, speakers, printer, etc. may also be included. All such devices are well-known in the art and need not be discussed at length here.

Figure 1B:
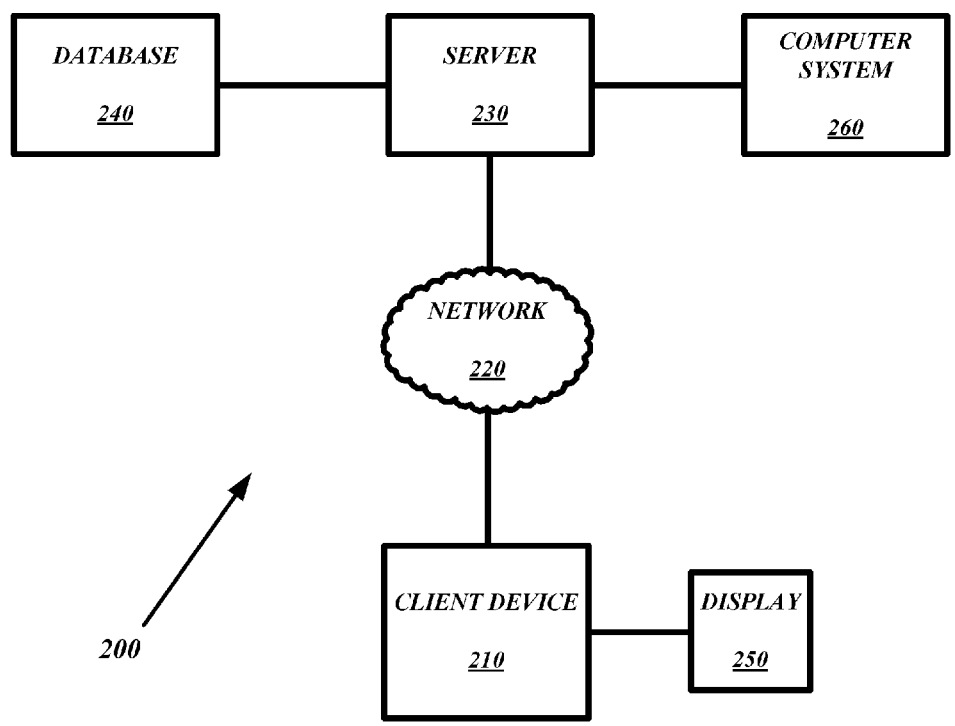

Referring now to FIG. 1B, an embodiment of the present invention can be described in the context of an exemplary computer network system 200 as illustrated. System 200 includes an electronic client device 210, such as a personal computer or workstation, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 1B includes one server 230 coupled to one client device 210 via the network 220, it should be recognized that embodiments of the invention may be implemented using one or more such client devices coupled to one or more such servers.

In an embodiment, each of the client device 210 and server 230 may include all or fewer than all of the features associated with the device 100 illustrated in and discussed with reference to FIG. 1A. Client device 210 includes or is otherwise coupled to a computer screen or display 250. As is well known in the art, client device 210 can be used for various purposes including both network- and local-computing processes.

The client device 210 is linked via the network 220 to server 230 so that computer programs, such as, for example, a browser, running on the client device 210 can cooperate in two-way communication with server 230. Server 230 may be coupled to database 240 to retrieve information therefrom and to store information thereto. Database 240 may include a plurality of different tables (not shown) that can be used by server 230 to enable performance of various aspects of embodiments of the invention. Additionally, the server 230 may be coupled to the computer system 260 in a manner allowing the server to delegate certain processing functions to the computer system.

In one embodiment, the methods and systems are implemented by a coordinated software and hardware computer system. This system is comprised of a set of dedicated networked servers controlled by TruCast. The servers are installed with a combination of commercially available software, custom configurations, and custom software. A web server is one of those modules, which exposes a web based client-side UI to customer web browsers. The UI interacts with the dedicated servers to deliver information to users. The cumulative logical function of these systems results in a system and method referred to as TruCast.

In alternate embodiments, the servers could be placed client side, could be shared or publicly owned, could be located together or separately. The servers could be the aggregation of non-dedicated compute resources from a Peer to Peer (P2P), grid, or other distributed network computing environments. The servers could run different commercial applications, different configurations with the same or similar cumulative logical function. The client to this system could be run directly from the server, could be a client side executable, could reside on a mobile phone or mobile media device, could be a plug-in to other Line of Business applications or management systems. This system could operate in a client-less mode where only Application Programming Interface (API) or eXtensible Markup Language (XML) or Web-Services or other formatted network connections are made directly to the server system. These outside consumers could be installed on the same servers as the custom application components. The custom server-side engine applications could be written in different languages, using different constructs, foundations, architectural methodologies, storage and processing behaviors while retaining the same or similar cumulative logical function. The UI could be built in different languages, using different constructs, foundations, architectural methodologies, storage and processing behaviors while retaining the same or similar cumulative logical function.

Figure 2:
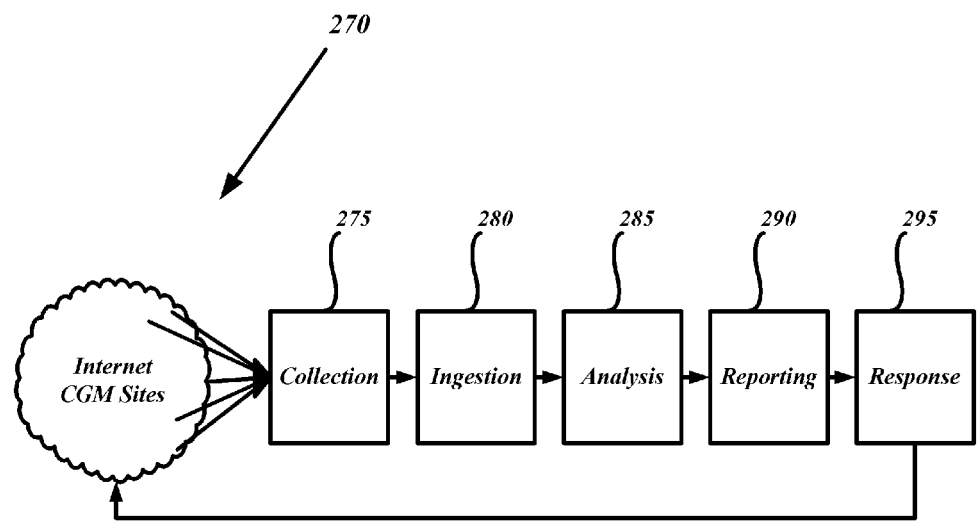

FIG. 2 shows a method for consumer generated media reputation management. The TruCast system can be broken down into elements, the elements are, but are not limited to the following: collection, ingestion, analysis, reporting and response.

Collection

In one embodiment, the Collection system gathers the majority of information about all CGM content online. This is a weighted, prioritized goal because TruCast functions in a weighted, prioritized way. This prioritization system is an optionally advantageous element of the collection system, called the Collection Manager. The Collection Manager receives input from internal and external sources about what sites have information of value, weights that information against a set of pre-described and manipulatable co-factors to allow tuning, and prioritizes the execution of collection against those sites.

In order to collect data from a blog site, an automated web scripting and parsing system called a robot is built. An individual "robot" is a sophisticated, coordinated script which informs a software engine of how to navigate, parse, and return web information. Every web site is comprised of code in one of several popular languages, which software applications called web browsers "render" or convert to a visually appealing "web site". A robot, similar to a browser, interprets site code to render an output. The desired output is not the "web site" that a browser would create, but an XML document, with columns of information about the content stored on a given site. Because robots are accessing the code, and not the rendered page, they have access to markup structures in the code which identify where specific content of interest is stored within the code. Robots use navigation based on Document Object Model (DOM) trees, regular expression pattern matching, conditional parsing, pre-coded transformations, mathematical and logical rules, tags, comments, formatting, and probability statistics to extract the specific content TruCast, in one embodiment, uses from raw web site code. Functions which perform this parsing are abstracted and codified in the robot engine, which is instructed on specific actions by a specific robot script. In pseudo-code, a robot designed to gather all of the blog content on a wordpress site would be scripted thusly: Load X URL, read code until "<bodytext>" is found, return all text until "</bodytext>" is found. If it is found create row 1, store this text in column A row 1. Find link with the word "next" in it, follow this link. Read code until "<bodytext>" is found, return all text until "</bodytext>" is found. If it is found create row 2, store this text in column A row 2.

This is a clearly incomplete example, as a plurality of robots have the ability to gather and transform a very complete set of knowable information from every website visited, including the full body text, author's name, date of the post, permalink to the post, title of the post, it's position on the page, how many comments it has, the full information about those comments, including author, date, order, body, any hyperlinks, graphics, scripts, emoticons, or other multimedia files included in a post, comment or site. Robots can be designed to gather data from only an individual site, or made more general to accommodate variation amongst similar sites. Robots parse the gamut non-structured web site code into XML encoded text that meets a predefined data specification of the design. The system, in one embodiment, collects all posts, all comments, and all desired content from every page that a robot visits.

Robots are not limited to these methods for content parsing. hierarchical temporal memory analysis, probability-based positive heuristics, and structural inference technologies can be used to make robots are capable of collecting information from a wider variety of sites.

Some sites have full-data RSS or Atom feeds (different than the typically truncated feeds), for which a specific set of robots exist. The system also has data vendors who deliver full-data feeds in several formats, these feeds are converted to the XML data spec by another class of robots. Robots are not limited to web content collection, but represent a scriptable system for parsing and transforming incoming and outgoing data based on pre-defined rules.

Figure 3:
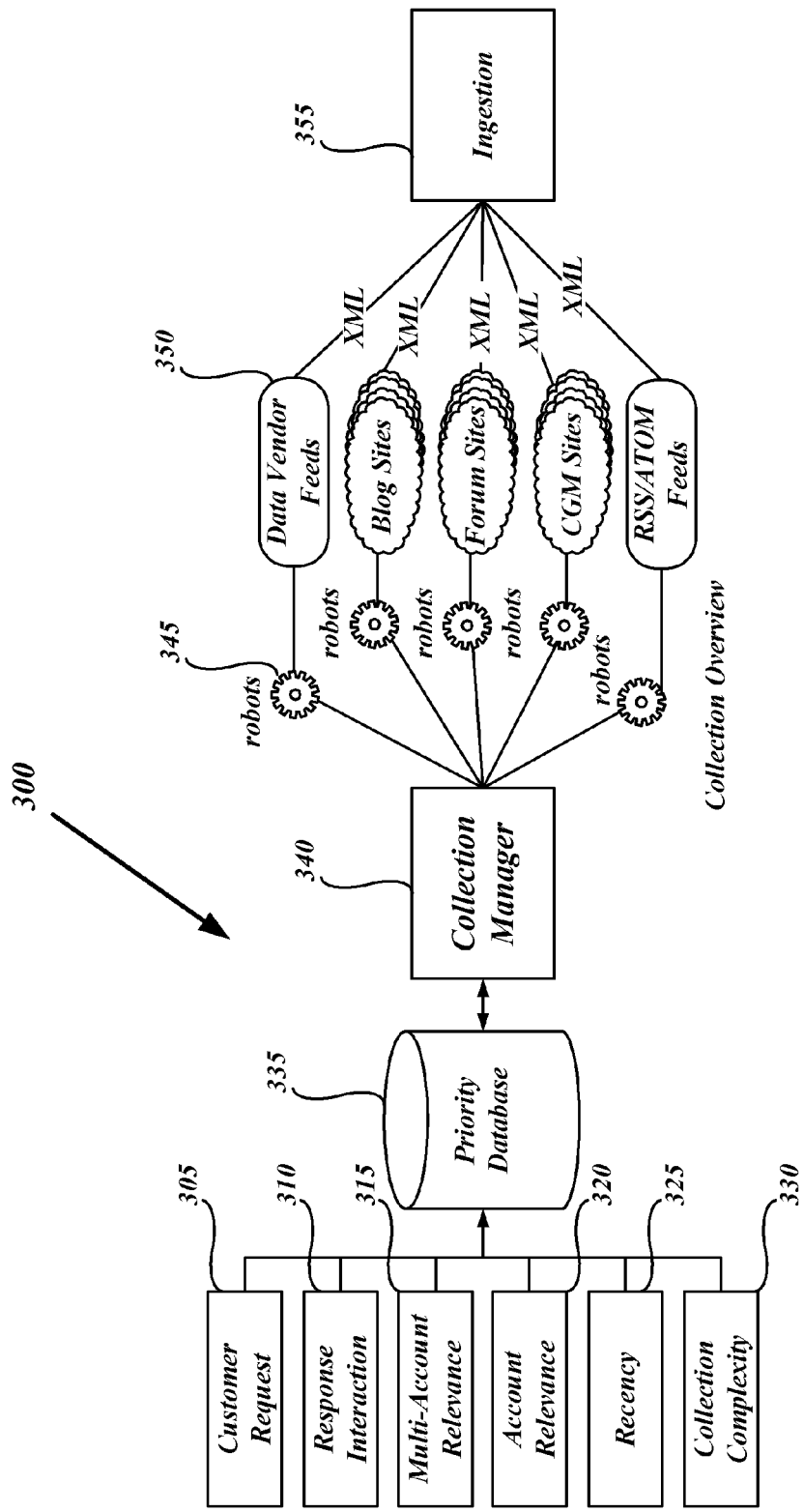
FIG. 3 shows a incoming data from collection being delivered to an ingestion system in one embodiment.

FIG. 3 depicts one embodiment of a CGM data collection system. In one embodiment, the first step of this system is to prioritize possible targets for collection. Inputs to this prioritization include, but are not limited to, sites specifically requested by customers (305) and the number of responses the system is written to a given site (310), the number of accounts that find content from this site relevant (315), the total count of relevant content available on the site (320), the date of the most recent post written on the site (325) and the historical performance of the system at gathering content from this site (330). The priority database maintains a list of co-factors which are calculated priorities for each site based on these inputs. When the Collection manager (340) determines that it has excess bandwidth/resources to execute more robots, it polls the priority database (335) to determine which robots (345) and then executes them. The collection manager also stores the records of robot activity so that it can add this information to the priority database (335). Robots, once launched by the Collection Manager, interface with their targets (350) to return XML-formatted CGM content to the Ingestion system (355).

Figure 4:
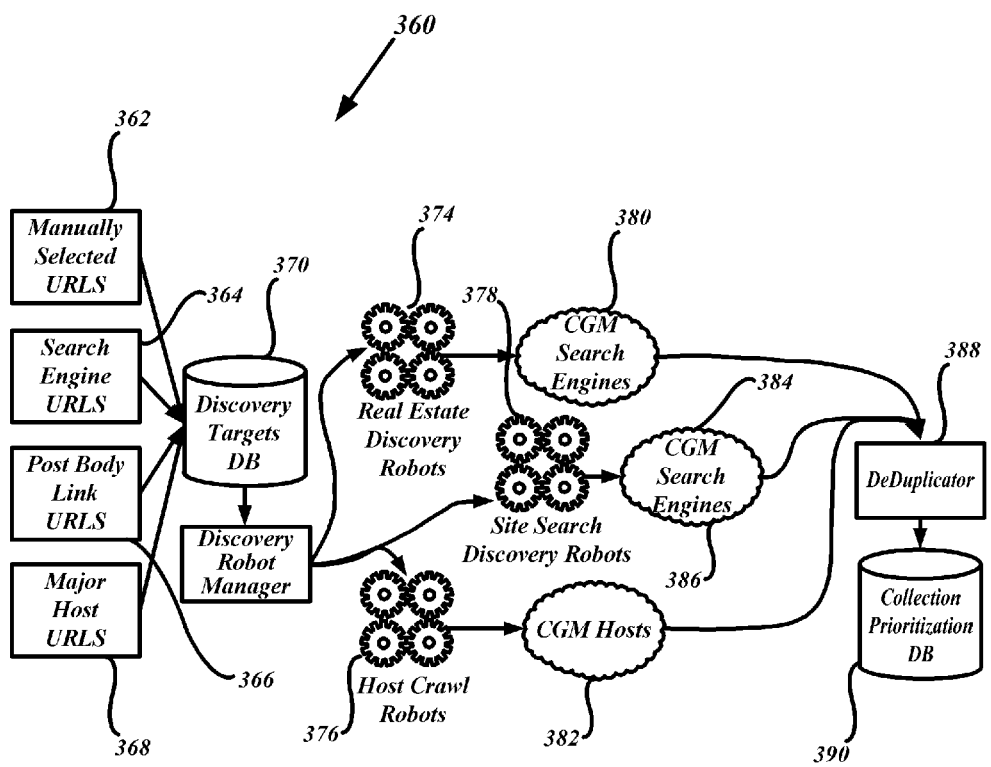
FIG. 4 is a depiction of one embodiment of a CGM site discovery system.

FIG. 4 is a depiction of one embodiment of a CGM site discovery system. Site discovery is the process of finding the URLS of new CGM sites on the Internet. The coordination is performed by the Discovery Robot Manager (372). This system retains performance information of the three methods, and determines what percentage of available resources (cpu time, bandwidth) to spend running each of the three methods in order to discover the most new URLs possible. The Discovery Robot Manager receives input from the Discovery Targets DB (370) which stores all of the information to execute each of the three methods, most notably the URL targets for each method. This system is fed information from customer or internal research discovered URLs (362) URLs of known search engines (364) URLs found in the post bodies of CGM content (366) and the URLs of the directory pages for each of the major blog hosts (368). Each method uses this information and a script for web interaction, called a robot, to discover new CGM URLs. The first method is called the "Real Estate" method. When the Discovery Robot Manager (372) determines that it is efficient to do so, it will launch a Real Estate robot for a specific search engine (374), and supply it with a list of keywords from all account topics which is held in the Discovery Targets DB (370). This robot will visit the search engine and fill in the search form with each keyword, and gather, by way of regular expression pattern extraction, the URLs of the results from the first 4 pages of results. This information will be delivered in XML format to the de-duplicator (388), which will eliminate known URLs, and then be stored in the Collection Prioritization DB (390) for collection. The second method, Site Search, is very similar to the Real Estate method, uses the same robots, but behaves in a different way with different input. The Real Estate robots use keywords from the topics in the accounts. The Site Search method has a pre-determined list of keyphrases designed to be representative of the full gamut of discussion on the web. The Discovery Robot Manager (372) collects this information from the Discovery Targets DB (370) and executes a Site Search robot, which searches the input keyphrases to retrieve the first 20 pages of results. Because of the much larger number of searches, these robots are designed to heavily obfuscate and avoid patterned interaction with Search Engine servers. The URLs discovered by Site Search robots are delivered to the de-duplicator (388), and from there to the Collection Prioritization DB (390). Site Search robots can also alternately be sent input URLs that are blog sites instead of search engines. Within this context they will visit every hyperlink on the site, searching for new links to previously-unknown sites. This can be delivered as new URL output similar to the other methods. The third method, called Host Crawl, uses different robots to visit the directory listing pages on major CGM hosting engines. These directory pages' URLs are stored in the Discovery Targets DB(370). The Discovery Robot Manager (372) launches a Host Crawl Robot (376) which visits a CGM Host directory page (382) and visits all of the hyperlinks on that page retrieving all of the URLs that are available. This information is sent to the de-duplicator (388) and on to the Collection Prioritization DB (390)

Ingestion

Figure 5:
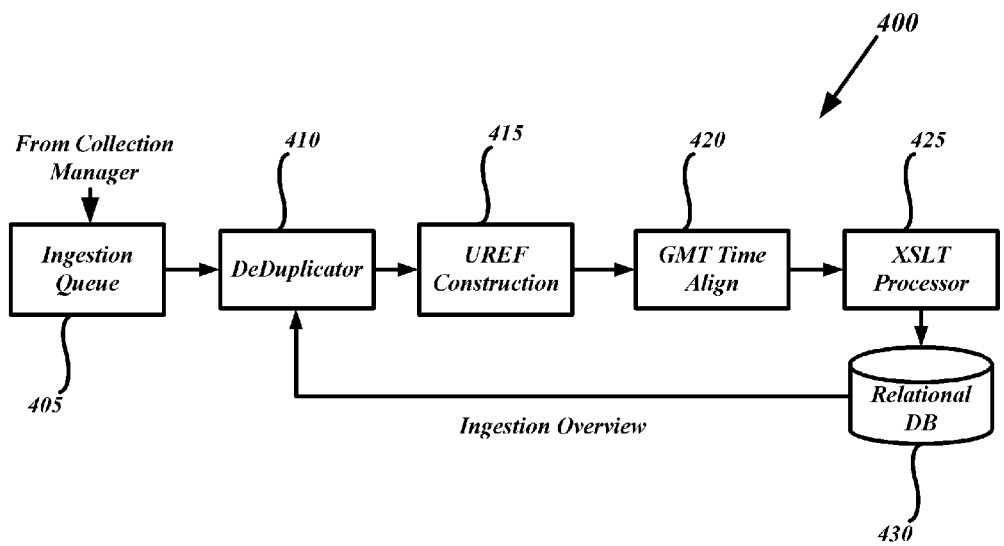
FIG. 5 provides an overview of ingestion in one embodiment.

FIG. 5 depicts one embodiment of a data ingestion system. This system receives input from the XML data outputs of robots launched and administered by the Collection Manager (400). These XML data sources are queued in an Ingestion Queue (405). This queuing process is a buffering function because all of the remaining steps are a stream processing method which requires a steady stream of content to work at maximum efficiency. Due to the dynamic nature of the volume of XML data input, the Ingestion queue holds a backlog of incoming data and outputs it at a steady rate. This flow of data is delivered first to a system which compares incoming CGM content information to all previously collected content, based on posted date, permalink URL, and post body to ensure that the data does not already exist in the system. This is the de-duplicator (410). In one embodiment, the system and method prevent de-duplication by comparing the body of the post to previous post bodies and deletes duplicates. In another embodiment, once this system has culled duplicate documents, it hands those documents to a UREF constructor (415) which creates a new uniqueID number to easily index and track unique content within the system in one embodiment of the invention. Next, content is delivered to a GMT time aligner, which converts all date and time stamps to be relative to Greenwich Mean Time (420). Next, this XML format information is transformed using an XSLT (425) or eXtensible Style Lanugage Transformation processor, which reformats the data for rapid delivery into the indexing system and relational DB systems (430). In one embodiment, TruCast performs several cleaning and refining steps upon incoming CGM content enclosed in the XML format. The system eliminates duplicate content using a fuzzy logic comparison between existing stored content and incoming new content based on post body, permalink, and date information. This comparison is tunable and weighted, where positive matches are clear indicators of duplication, but agreement is optionally advantageous across multiple values to confirm duplication. For example, if two posts came from exactly the same date and time to the second, it's unlikely, but possible, that they are truly different unique posts. If, however, the body text is 90% the same, and the URL is 90% the same, it's extremely unlikely that the two posts are unique. On body text, this comparison includes text clustering analysis, to use word counts as a computationally inexpensive way to further evaluate uniqueness. Content that is malformed or incomplete according to the data spec is removed and warnings sent to the responsible collection manager element. Once a document is determined to be unique a UREF (unique reference) value is created and appended to it so that there is a relevant single value to index this information within the system. All incoming post dates are aligned to GMT. In one embodiment, TruCast delivers all prepared content into an indexing system which formats the data in such a way that it can be rapidly searched based on relationships to other data, keyword presence, account relevance, and date. This structure includes storage of data within a distributed indexed data repository as well as several SQL databases. At least one portion of a SQL database is optimized for at least one of the following different consuming systems: the UI, the visualization systems, the reporting and statistics systems, the collection priority database, and the target discovery database, as well as the individual account level data stores.

Analysis

In one embodiment, TruCast is designed to determine, with a high degree of confidence, the conceptual relevance of a given piece of CGM content to a "topic" or concept space. Topics can be of any breadth ("War" is just as sufficient a topic as "2002 Chevy Silverado Extended Cab Door Hinge Bolt Rust"). Topics are abstract identifiers of relevance information about a given piece of CGM content. Each topic can also be understood as a list of "keyphrases" or keywords with Boolean modifiers. Each topic can contain an unlimited number of keyphrases that work as the first tier of pattern matching to identify content that is relevant to an individual account. Each post discovered by the system, and, in one embodiment, could be relevant to one topic, many topics, many topics across many accounts, or no topics at all.

Figure 6:
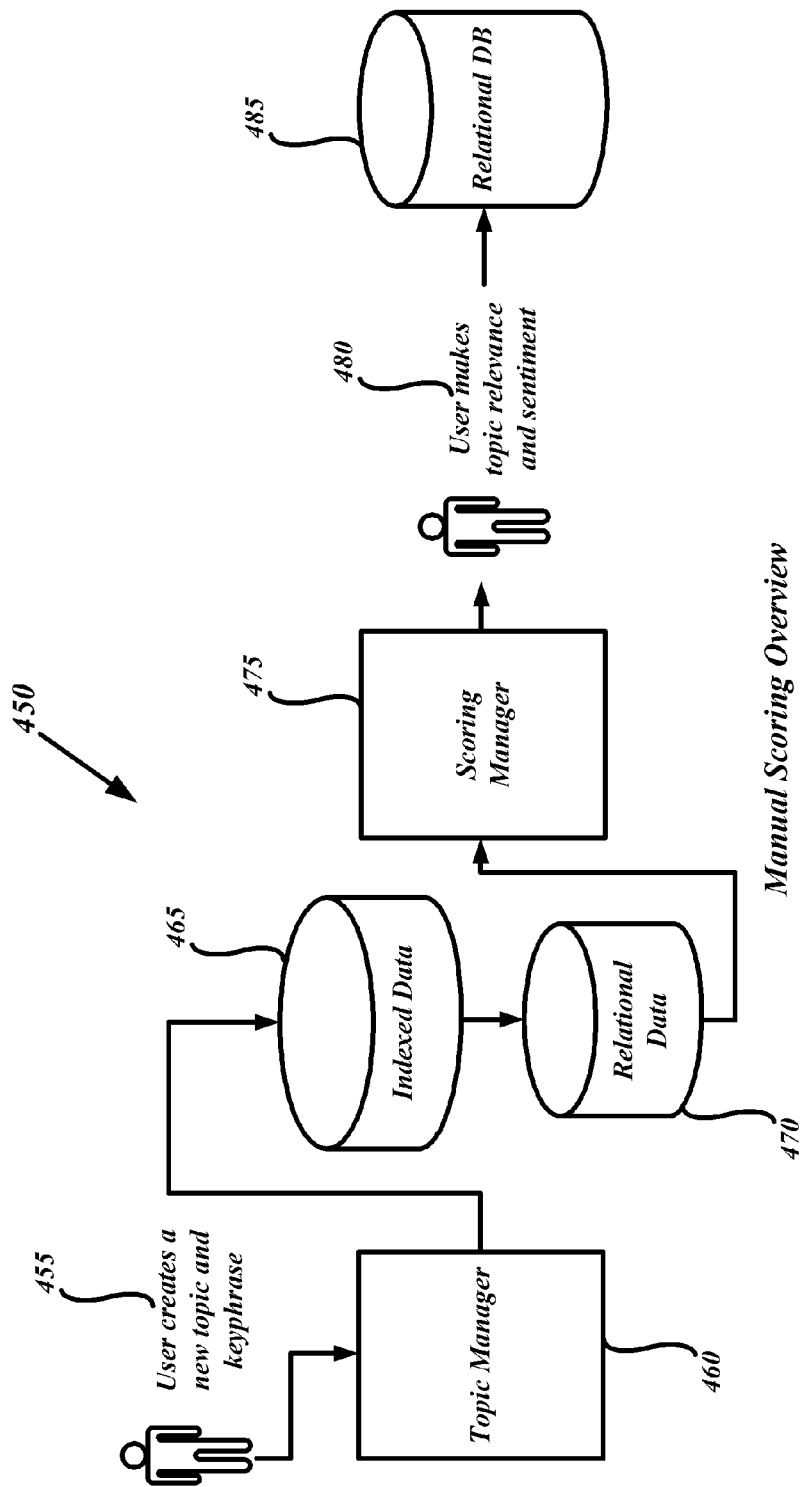
FIG. 6 shows manual scoring in one embodiment.

FIG. 6 depicts one embodiment of a system for manually appending topic relevance and topical sentiment to blog posts. This process begins by discovery of potentially relevant content by way of keyphrases. Keyphrases are grouped into topics. Topics and keyphrases are created by users (455) in the Topic Manager panel (460) within the UI. Once a new topic and keyphrase is created, this information is transmitted to the indexing system (465) which begins to examine all incoming data for matches against this keyphrase. The information is also handed to the relational database system (470) which is also the StoreDB component of the Historical Data Processor as illustrated in FIG. 38. This system examines all data that has already been processed to see if it matches this new keyphrase. This separation accelerates both processes because of optimized structure in (465) for stream processing and optimized structure in (470) for narrow, deep searches against a significantly larger dataset. Information from both of these systems are passed in queue form to the Scoring Manager (475) which provides a UI for users to annotate topic relevance and topic sentiment information which is stored in the relational DB (485). In one embodiment, TruCast contains a user interface that allows users to create topics, create keyphrases that are used to search for potentially relevant posts for that topic, place potentially relevant content into a queue for review, review the text and context of individual content, mark that content as relevant to none, one, or many topics, (thereby capturing human judgment of relevance), and store that information in the relational database. This system is called the Scoring Manager.

This method, where a post is matched by keyphrase, scored by humans, and delivered to the outputs of TruCast, in one embodiment (visualizations, reports, and response), is a basic "manual" behavior of the system.

The behavior of this tiered system of relevance discovery and analysis changes over time to reflect the maturation of the more sophisticated elements of the system as their contextual requirements are much higher. A keyphrase match is absolute, in one embodiment; if a post contains an appropriate keyphrase, there is no question as to if a match exists. The Conceptual Categorization system is built to apply a series of exemplar-based prediction algorithms to determine the conceptual relevance of a given post independent of exact keyphrase match. This makes the system, in one embodiment, more robust and provides more human-relevant information. In an exemplary embodiment a blog post body includes the following text: "I really enjoy looking out my windows to see the vista out in front of my house. Buena! It is so great! I wish my computer was so nice, it is a little broken edgy eft sadly." (EX.1)

A topic for the Microsoft Corporation, looking for the words "windows vista computer" in order to find online discussion about their new operating system would find this post by keyphrase match, despite the fact that the user discusses using "edgy eft" which is a code name for Ubuntu 6.08, a competitor's operating system. A topic for Milgard Windows and Doors Corporation that is looking for discussion about windows in need of repair would find this same post looking for the keyphrase "broken house windows" despite the fact that clearly the writer is enjoying looking out of his unbroken windows. The Disney Corporation, looking for discussion about their film company "Buena Vista" would find this post, which has nothing to do with them at all. A biologist researcher looking for references to immature red newts would search for "Eft" only to be sadly disappointed in another result about Ubuntu's software. In all of these cases keyphrase matches have proven insufficient to successfully match relevant content to interested parties. Boolean modifiers help (vista NOT Buena) but consistently fall far short of expectations, and require non-intuitive and time consuming research and expertise.

Automated Conceptual Categorization

Figure 7:
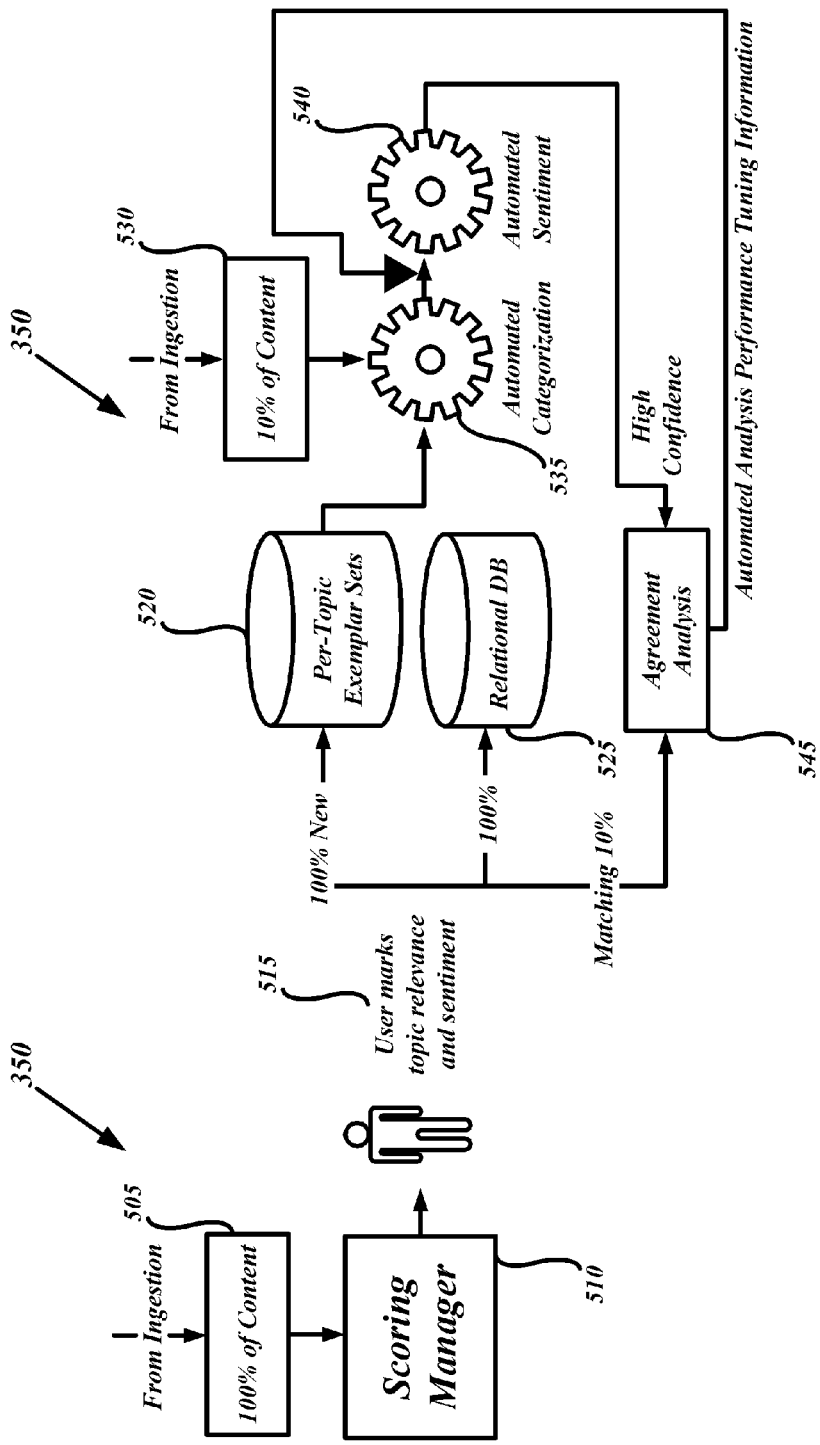
FIGS. 7-9 show the smooth transition between user scoring and automated scoring, in one embodiment.
Figure 8:
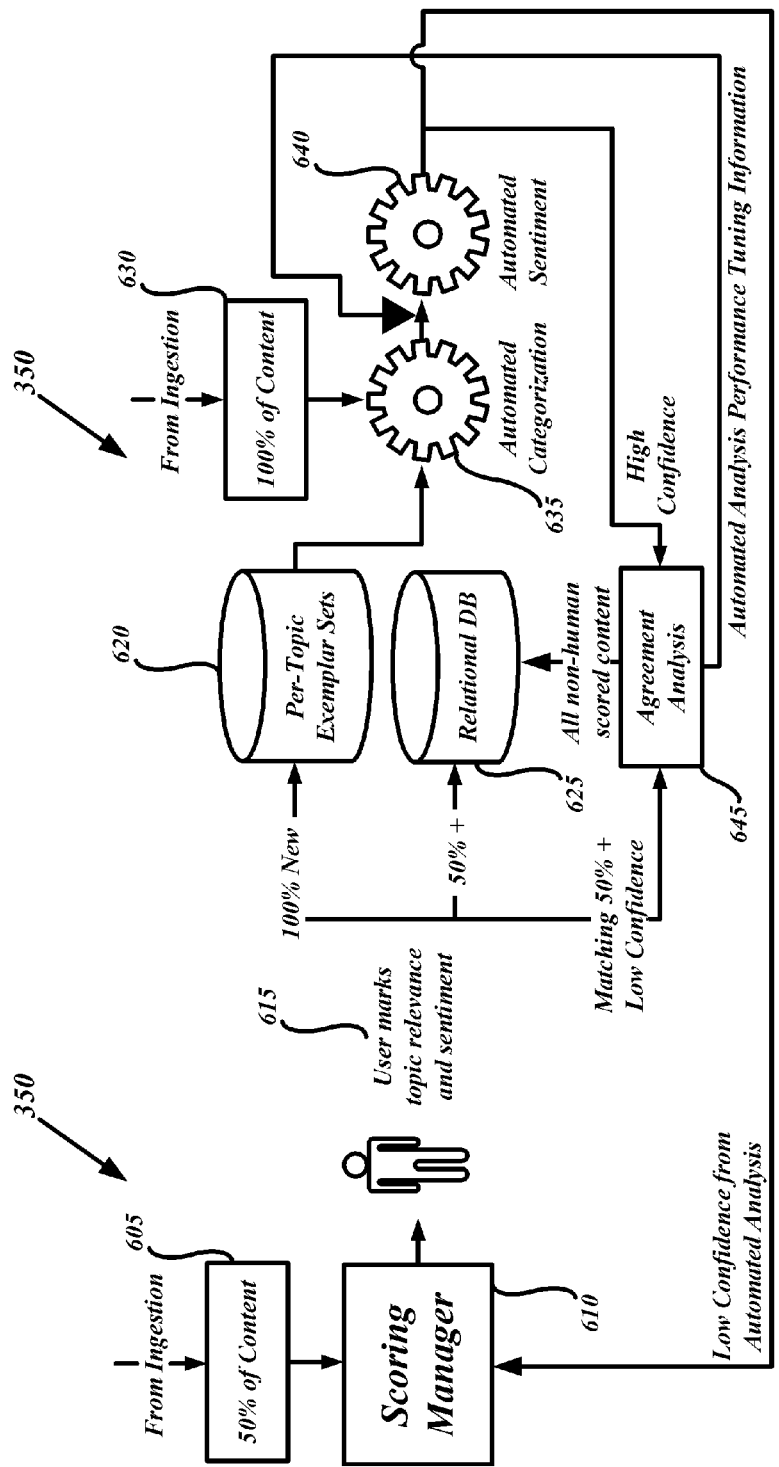
Figure 9:
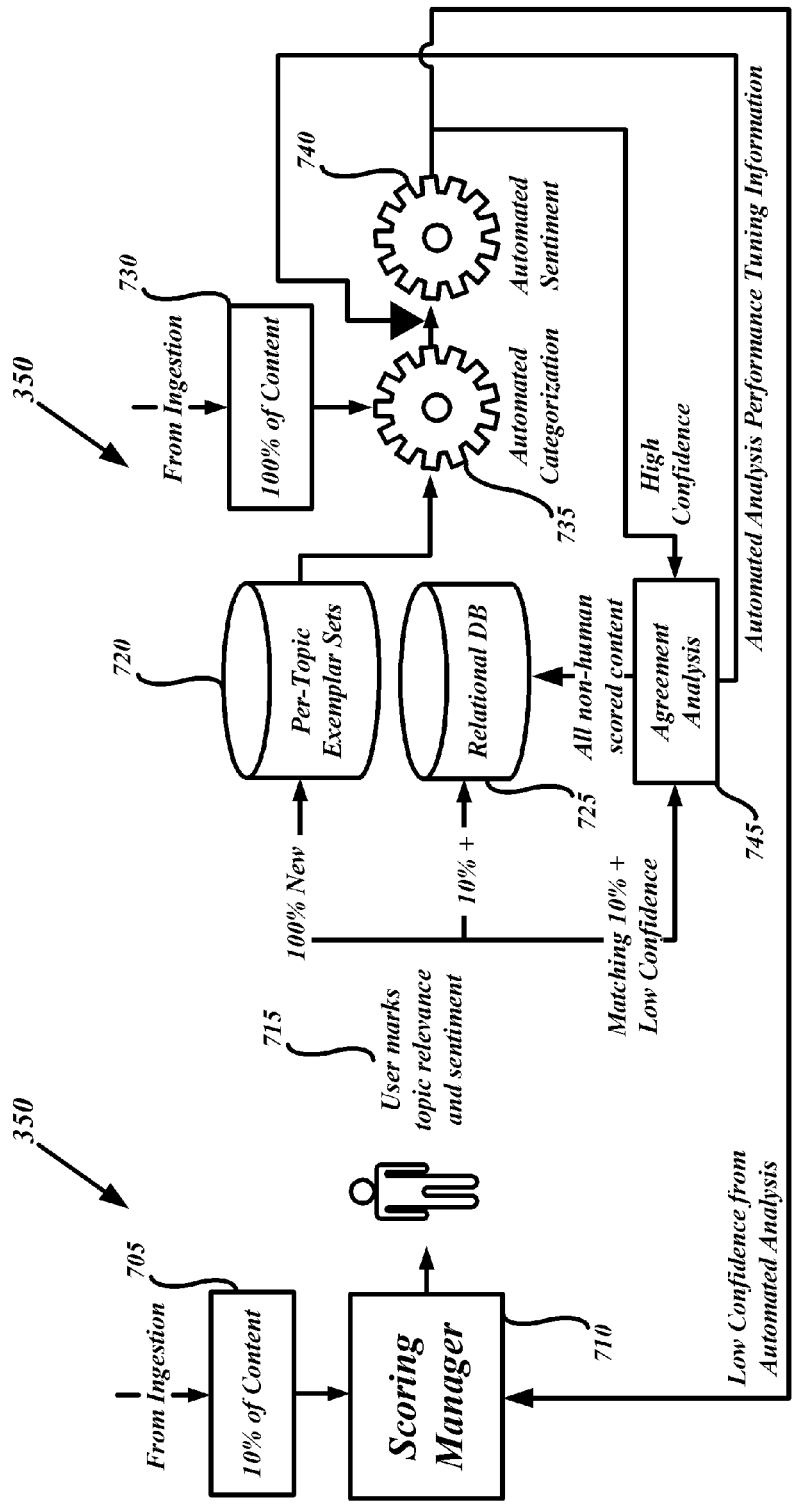

FIGS. 7-9 show the smooth transition between user scoring and automated scoring and depict the progression of the operation of one embodiment for an automated categorization and sentiment analysis system. This progression occurs from the early state, where the automated system performs poorly due to a lack of contextual examples, to a mature state where the automated system performs excellently as a result of robust contextual examples. The system, in one embodiment, reacts to this improvement by reducing the rate of post queue delivery to users and increasing the acceptance of analyzed posts from the automated system as confidence ratings and exemplar set sizes increase. This process accepts input from the ingestion system (350) into two separate queues. The first queue delivers content to the scoring manager (610) where it is scored by humans (615) and then delivered to the per-topic exemplar sets (620) based on topic relevance, the relational database (625) for storage and use in the response, visualization and report sections, and to an agreement analysis system (645). A second queue delivers content to the automated categorization system which accepts input from the per-topic exemplar sets, as well as topic performance and tuning information from the agreement analysis system (645). This system passes conceptually relevant content to the sentiment analysis systems which also has access to the exemplar and agreement analysis tuning data. The automated systems append a "confidence" score to their evaluations, which are used as a threshold to decide trust in the evaluation's accuracy. In the early behavior of the system, due to the lack of examples and agreement analysis tuning data, often this confidence score is very low. As more manual scoring is completed, and agreement analysis improves, the percentage of data flowing into the automated systems increases, and once performance is proven on the full data stream, the flow of data to the manual scoring application begins to decrease. Continual tracking of the agreement analysis system tracks for the varying level of inaccuracy that the automated systems can create as a result of changes within topical vernacular, user vocabulary, or new common phrases, inflections, or other changes in the typical word patterns present in incoming CGM content are reflected by the dynamic adjustment of the percentages of data flowing into these two systems. Over time, given sufficient, accurate scoring by humans, the automated systems should be capable of accurate analysis on 100% of incoming documents, which would reduce the role of required human interaction to only providing audit and contemporary vernacular updates by way of minimal scoring. In one embodiment, TruCast, contains a Conceptual Categorization system which has functionality to evaluate posts for relevance by way of statistical analysis on examples provided by humans using the scoring system. Because humans are reviewing the content, from a specific customer's perspective, that content is reliably scored in context. If the above example post was scored by a human scorer for Microsoft, it would be found irrelevant to the Windows Vista operating system. By statistical analysis of hundreds of posts marked relevant or irrelevant to individual topics, the system can utilize not just keywords, but the entire body of the post to determine relevance. This statistics calculation leverages text clustering assisted by stop words exclusion, noun and pronoun weighting, punctuation observation, and stemming near-word evaluations.

Automated Sentiment Analysis

When users score content for relevance in the scoring manager, they also may assert the sentiment of the content for each topic that it is relevant, from the perspective of their account. Users will mark, from their perspective (as informed by a set of scoring rules described by user administrators) the sentiment reflected about each topic. This information will be stored for later use in a relational database.

These human markup actions serve two purposes. First is to capture this data for direct use within a response system, and a series of data visualizations that leverage topic and sentiment information to elucidate non-obvious information about the content TruCast collects, in one embodiment. This is the "manual" path for data to flow thru the system, in one embodiment. The second use for these posts is that they serve as example data for an exemplar driven automated sentiment analysis system that mirrors the conceptual categorization system.

Similar to the process of categorization, the system, in one embodiment, leverages an exemplar set of documents to perform an automated algorithmic comparison in order to determine the sentiment, per topic, contained within an individual post. This requires a larger number of examples than categorization analysis, (~100 per sentiment value per topic) due to the four different stored sentiment values, "good", "bad", "neutral" and "good/bad". Due to the significant complexity of sentiment language within human language, additional processing is performed upon each document to improve the accuracy of the analysis. A lexicon of sentimental terms is stored within the system, and their presence has a weighted impact on the analysis. Negation terms and phrase structures also alter the values associated with sentimental terms. A stop words list eliminates connective terms, object nouns, and other non-sentimental terms within the text, reducing the noise the comparison has to filter thru. Sentence detection uses linguistic analysis to subdivide posts into smaller sections for individual analysis. A series of algorithms are compared for accuracy and performance on a per topic basis, to allow the performance of the analysis system to be tuned to each topic.

Automated Analysis Management

Both of these processes work upon the post-ingestion content, directing automatically analyzed documents into the remainder of the system workflow. This process reacts to the number of exemplar documents that are available. If incoming content is keyphrase-relevant to a specific topic, a determination is made if sufficient exemplar documents have been gathered by the system from users. If enough exemplary documents are not available, that post is delivered to the scoring queue which feeds content to the scoring manager interface. If some documents are present as exemplars, the system will attempt automated categorization and sentiment analysis, but still deliver posts to the scoring manager. This creates a pair of analysis results, one from the computer and one from the user. These are compared, and when a sufficient alignment (agreement frequency) is reached, the system starts delivering auto-analyzed content directly to the reporting and response systems, saving human effort.

This is a sliding ratio from 100% being delivered to the UI and 0% being auto-analyzed, to only 1-10% being delivered to the UI and 100% being auto-analyzed. Once the ratio of content being reviewed by human scorers reaches 10%, and accurate performance of the automated analysis is maintained, mature operation of the automated systems has been achieved. This is the most efficient operation of the system, in one embodiment.

The system utilizes an aging and auditing system to ensure that the oldest human scored posts are ejected from the exemplar set and replaced by new human scored posts over time. The system also performs internal cluster analysis and ejects significant outliers from the system. Both of these processes are tunable by administrative control panels. The result of this aging and auditing should be that as the vernacular, word usage, and issues discussed internal to a given topic change over time, exemplar documents continue to reflect that change and accurately map relevance.

Reporting

The system, in one embodiment, of databases which receive topic relevant, analyzed content is connected to a series of web-based visualizations to allow users of the UI to understand valuable information about the discussions captured by the system, in one embodiment. Reporting during all stages of the system and method described herein.

Response

Figure 10:
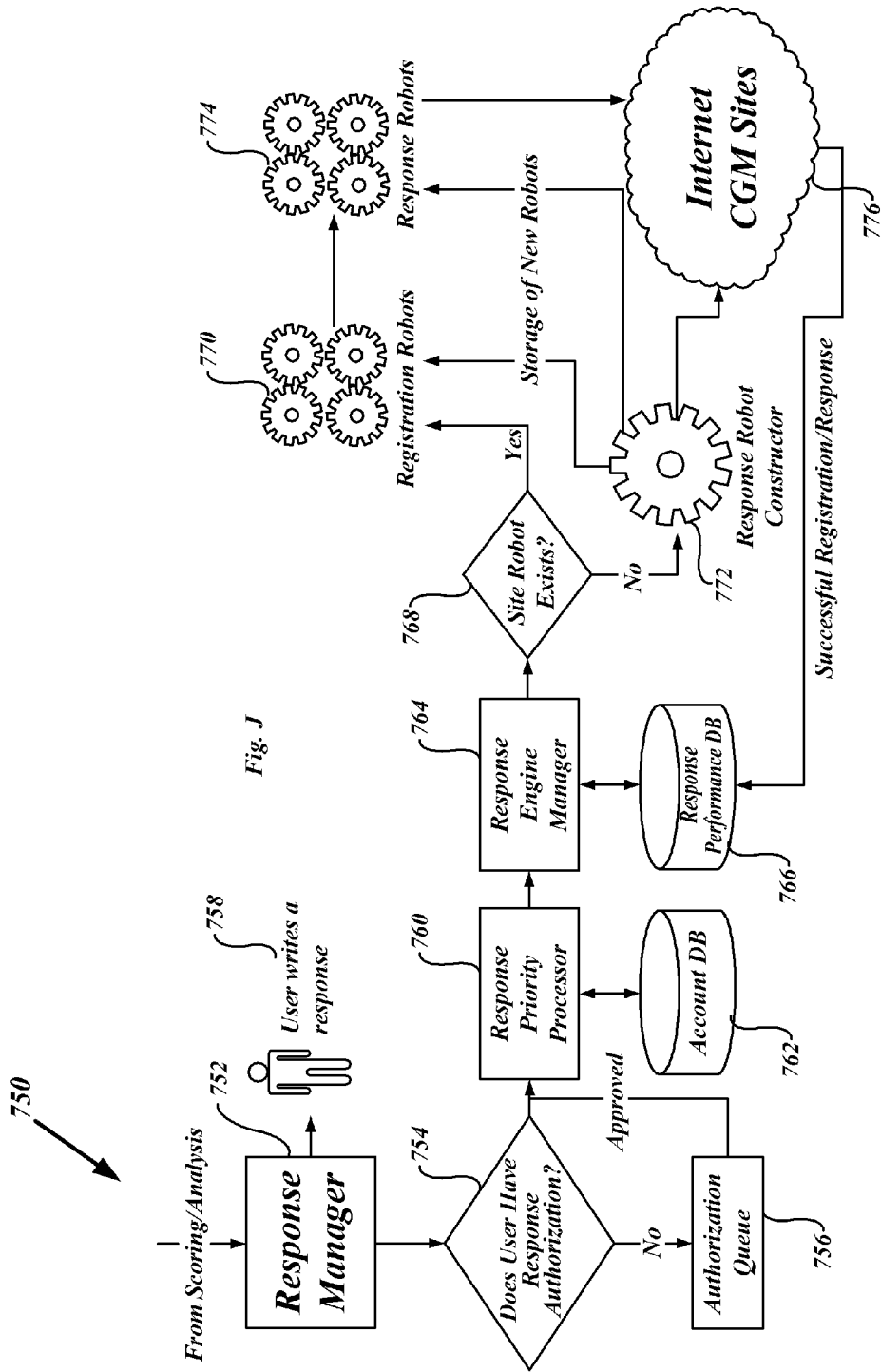
FIG. 10 is a depiction of one embodiment of a CGM response engine.

FIG. 10 is a depiction of one embodiment of a CGM response engine. In this embodiment the Response Manager UI (752) is populated with a written response by a user (758). This user is evaluated for authorization permissions against a stored value in the Account Database (754). If the user does not have appropriate authorization, their response will be delivered to an authorization queue (756) to be approved by an administrator. If a response is not approved it is deleted. If a responder has authorization, or their response is approved, it will be delivered to the Response Priority Processor (760) which determines if any delay or promotion is required for a given approved post. It also observes the original posted date of the content that is being responded to and prioritizes based on most recent posted dates. The Response Engine Manager (764) requests responses from the Response Priority Processor (760) to deliver to the registration and response robots. The Response engine manager checks the response performance DB (766) to see if a given URL has a response robot that has already been created or not. If it has not, the response and all associated information is sent to the Response Robot Constructor (772). This tool provides an interactive UI to allow semi-automated interaction with a target CGM site's registration and response systems to deliver the response to the site, and record the interaction. These interactions include loading pages, following hyperlinks, assigning input data to site form fields, navigating to web mail systems for authentication messages, completing CAPTCHA tests, interacting with IM and SMS systems, performing sequential interactions in correct order and submitting forms. The result of these actions should be a newly registered user (if required by the site) and a response written to the blog site. The interaction is recorded and stored in the Registration and Response Robot sets (770, 774). If, when the Response Engine Manager is sent a response, it determines that a robot already exists, it will execute that robot without human interaction. This has the same effect, creating a new registration if required, and writing the response to the CGM site. Success or failure of robots and robot constructor actions are recorded in the Response Performance DB for evaluation and manual code re-work if required.

The response manager is a system to convert into a manageable, scalable business process the task of responding to CGM content by way of comments. All CGM systems that allow interactivity (>90%) have a web based system for allowing readers of content to respond by way of a comment, note, or other stored message. This often requires that users register themselves on the site, by providing a username, password, and other personal details. Sometimes this requires providing an e-mail address, to which an activation link is sent, or an instant messenger account which is sent a password. This isn't too difficult for casual users to maintain, especially if they only interact with a few sites. Professional users however often have to interact with thousands of different sites. The system, in one embodiment, aims to reduce this workload for responders by automating the registration and response process.

Response Workflow

In one embodiment, the TruCast UI system facilitates a workflow for many users to interact in a coordinated, managed way with CGM content. Once a post as been successfully analyzed by either a user in the scoring manager, or the automated analysis systems it becomes available within the response manager. This is a UI system for a user to write a comment in response to relevant posts. The UI may be split into two halves, one which shows information about the post being responded to (author, date, body text, and other comments from within the thread, as well as stats about the author and site responsible for the content.), and the second that contains the new response the user is writing. The system provides an interface called the response vault for managers to pre-write message components, fragments of text, names, stats, and pieces of argument that they'd like responders to focus on. These snippets can be copied into the response body during authoring. Once a user is done writing a response, the can click a "send" button which delivers the newly written response to the relational database.

Response Automation

Once the system, in one embodiment, receives a response record from the response manager, it determines which blog site contains the original message, and the link to the response page for that site and message. If the system, in one embodiment, has never written a response to that site before, the record is delivered to the response interactor UI or Response Robot Constructor, which is run by company employees. This UI allows an employee to visit the appropriate site, navigate to the appropriate fields, and assign the information from the record to fields on the site that will cause the site to record a response. This action is recorded, and converted into a script, which is stored as a new robot for later re-use. If TruCast has already written a response to a given site, this script will be used eliminating the need for repeated human interaction.

This system utilizes a similar engine and scripting methodology as the collection system. Registration and Response robots are scripted automations, which interpret the code of CGM content pages, web pages, pop3 or web based e-mail systems, and other data structures, and perform pre-determined, probabilistic, or rule driven interactions with those structures. By interpreting page code and scripted instructions, they can imitate the actions of human users of these structures, by executing on screen navigation functions, inserting data, gathering data, and reporting success or failure. An example registration robot would be given as a data input the registration information for an individual user of the system, in one embodiment, and given the URL to a site that the user wishes to register on. The robot would visit the site, navigate by markers pre-identified in the page code to the appropriate form locations to insert this information, confirm it's insertion, and report success, as well as any output information from the site. An example response robot would accept as input the registration information for a given user of the system, in one embodiment, the blog response they've written, and the URL to the site that the user wishes to respond to. The robot would load the site into memory, navigate the page by way of hyperlinks or pre-determined, probabilistic or rule driven information, examine the page source code to discover the appropriate form fields to insert this input data into, do so, and report success. Other embodiments of this solution could include purpose built scripts that perform the same assignment and scripted interaction with CGM sites to perform registration and response tasks. Smaller scale systems would have users perform the manual field entry and navigation tasks, but captures these interactions for conversation involvement identification and maintenance by the analysis systems.

There are several sophisticated systems for preventing automated interaction with registration and response forms on CGM sites. Because the system and method is engine and script driven, and each transaction happens by way of a modular execution system, the system can tie the process to outside support modules to defeat these automation prevention systems. TruCast also stores a significant body of information, in contact card format, about responders so more complex registration questions can be correctly answered.

Conversation

The response system within TruCast delivers posts to blog sites, which are the target for the collection system. As the system, in one embodiment, collects content it matches incoming content to evaluate if that content belongs to a thread that the system has interacted with. When the system discovers posts that were written after a response that TruCast wrote, it is returned to the queue of posts assigned to the user who wrote the response, with a maximum priority. This way a conversation can be facilitated. The system also allows review of conversations by way of an Audit Panel, which gives a timeline of interaction for a conversation between a blogger and a TruCast user.

Transparency

Given the volatility of the CGM space, the value it represents, and the danger of negative publicity for any companies or other interested parties who choose to interact by way of responding by comment, it is optionally advantageous to maintain the appearance of correct attribution. The users are responsible for the content they generate. Because of the sophisticated analysis tools available for CGM site owners to evaluate the source of incoming comments, it's optionally advantageous that the system, in one embodiment, correctly portrays correct attribution. While using the TruCast system to automate response delivery to blog sites, correct attribution of content origination is retained.

Indicators of origination include: (1) E-mail address used in registration/response process; (2) Owner of e-mail address domain's as reported by the WHOIS information; (3) Receipt of e-mail sent to this address by the correct customer to the system, in one embodiment,; (4) IP Address used in the response/registration process; (5) Reverse DNS lookup on the IP Address used in the response/registration process, and the resultant WHOIS information; and/or (6) Internal consistency of blog user registration information.

The tool collects significantly more information about responders than is typically necessary. This includes obscure information like birth date, favorite car, mother's maiden name, favorite popsicle flavor, user picture, etc, to ensure that registrations are complete, feature rich, and transparent. The manual response app and robots accept this data in the response and registration steps. This resolves issue 6.

By way of this unified approach to transparency, attribution accuracy should always be retained.

If customers or other users desire misattribution of message source, IP and e-mail anonymization features can be enabled. This obfuscates the source of output messages by way of a rotating IP proxy environment.

Administration

It is valuable to keep blog-focused workers on message, saying appropriate things, making persuasive arguments, and being considerate participants in the community. In order to facilitate this, the system, in one embodiment, has a set of authorization features. Administrators have access to a per-user toggle which forces the posts that users write to be delivered to a review queue instead of the response automation system when they press the "send" button. This queue is accessible by administrators to allow review, editing, or rejection before messages are submitted.

Administrators can also create and manipulate sorting rules which prioritize content within user scoring and response queues based on topic, site, engine, author, and date information. This forces users to work on appropriate content, and allows administrators to segment scoring and responding tasks to SME's who have the most context for a given topic, site, engine or author.

Figure 11:
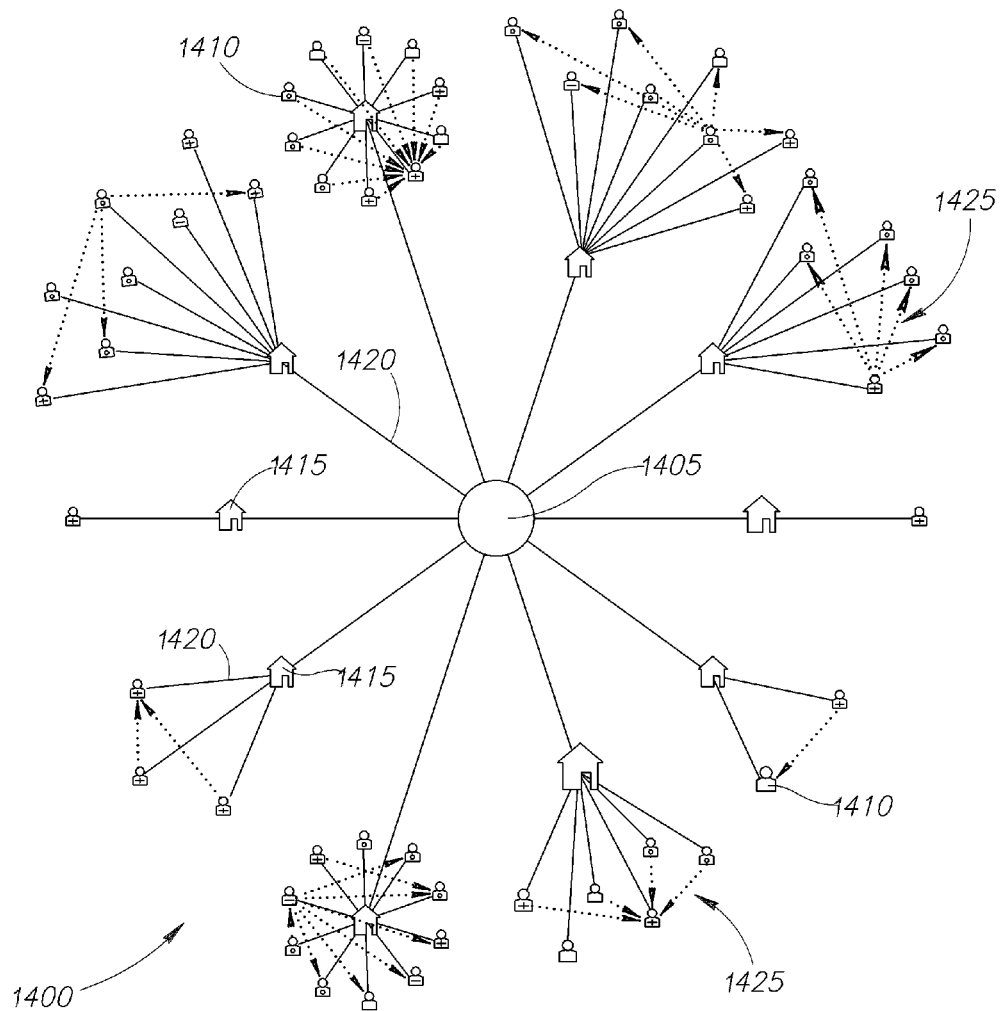
FIG. 11, shows an exemplary authority map.

In an embodiment, and referring now to FIG. 11, an authority map 1400 is illustrated, which may be displayed within a graphical user interface 1401 on the display device 250. The authority map 1400 is a tool for identifying and understanding the authors, associated with a specified topic of interest, that matter to a particular entity using such an embodiment. In the illustrated embodiment, the displayed map 1400 shows an icon 1405 representing a topic being analyzed, which, as illustrated, may be displayed as a hub of a hub-and-spoke configuration, along with a textual description of the topic. Also displayed are icons 1410 representing authors of varying levels of authority or perceived influence who have commented or otherwise posted an opinion on the displayed topic. These icons 1410 may further include a domain identifier associated with the author, as illustrated. Also displayed are icons 1415 representing sites of varying levels of authority or perceived influence hosting conversations involving those authors and the displayed topic. These icons 1415 may further include a domain identifier associated with the site, as illustrated.

In an embodiment, each of the icons 1410, 1415 may be presented in a distinguishing format to indicate varying levels of authority/influence, and/or prevailing opinion or sentiment on the topic, associated with authors and sites. For example, size of the icons 1410, 1415 may correspond to authority/influence of the respective author or site: bigger for more authoritative, smaller for less authoritative. Color, shading or pattern type of the icons 1410, 1415 may correspond to prevailing sentiment (e.g., green for positive, red for negative, grey for neutral, and orange for mixed). Lines 1420 connect the icons 1410 of authors to the icons 1415 of sites that host them, and from the site icons to the topic icon 1405 at the center. Dotted (or other distinguishing) lines 1425 represent conversations or other connections occurring between authors. In an embodiment, arrows at the ends of the dotted lines 1425 show the direction of interaction, pointing, for example, from commenter to original post author.

To populate the map 1400, a criteria panel (not shown), such a pull-down menu, for example, may be used to select the topic of interest. The interface 1401 allows a user to get additional information about any of the nodes (icons associated with authors, sites, and topics) on the display 1401. For example, by left clicking on a node, a small pop-up window with additional detail about that node will appear. The display allows one to promote or "pin" nodes that are of interest, which makes those items larger on the screen. Items may be pinned by clicking on the upper right hand side of the node icon.

Further included within an embodiment of the authority map is a series of calculations. For example, in an embodiment, the magnitude of author authority may be calculated based on data representing the topic selected by the user, using the conversations between authors and the activity generated by the commentary of a particular author (e.g., the number of comments posted in response to a comment by the author) to evaluate the author's authority. This data may be calculated or otherwise determined computationally/automatically (i.e., by execution of computer-executable instructions), by human analysis, or some combination of both types of approaches.

The magnitude of site authority may be defined or otherwise determined in a manner similar to that used to determine the magnitude of as author authority. Data representing content pertaining to a particular topic may be determined to have been written or otherwise produced by someone at a site. As such, sites having associated therewith a predetermined threshold number of comments pertaining to a particular topic may be determined to be an authoritative site. The magnitude of the authority of these sites may then be determined based on, for example, the amount or volume of comment pertaining to the topic in question and associated with each respective site. This data may be calculated or otherwise determined computationally/automatically (i.e., by execution of computer-executable instructions), by human analysis, or some combination of both types of approaches.

Sentiment may be calculated by a weighted metric on the overall sentiment distribution, which favors "sentimented" values over neutral values. This ensures that a user is seeing which way an author leans when writing on a topic. Counts and totals are reflective of the on-topic conversations based on the topic of interest chosen; if an author has written 200 posts, but only 5 are about the topic you're researching, the calculations will only leverage the 5 within the calculation. The result is that the user can set the context in order to identify authorities in relation to that context.

Further included within an embodiment of the authority map is a series of calculations. As raw data comes in from collection, the data is processed and analyzed in several ways. Each unique post or comment is first matched to one or more topics of interest leveraging term-based definitions. For each topic matched, a sentiment is assigned using either manual attribution or computational attribution. Computational attribution of sentiment is achieved using technology that correlates patterns between a set of known pieces of content that represent the sentiment for a topic to the individual piece of content being analyzed. For example, an embodiment uses text parsing in conjunction with Bayesian inference in order to assign a probability that a post exists within each of a neutral or sentimented "states." Each state is represented by a definition derived from groups of posts that are characteristic of that state. The comparison is done using the state definitions that are stored in an index resident on the client device 210 and/or server 230 and/or database 240 and comparing that state definition with the content in question. Alternatively, or additionally, an embodiment uses keyword/keyphrase/keysentence recognition in conjunction with an index, for example, that correlates a sentiment value with a particular or group of keyword/keyphrase/keysentence to determine an author's opinion on a topic.

When displaying an author or site's sentiment in the Authority Map, the dominant sentiment is calculated by a weighted metric on the overall sentiment distribution across all posts that match the topic being analyzed, weighting "sentimented" values over neutral values in a 4:1 ratio. For authors, the posts not only match the topic, but have also been written by the author of interest. For sites, the posts not only match the topic, but have also been written at the site of interest. Authority is then calculated based on the data representing the topic selected by the user, using the conversations between authors and the activity (post counts) to evaluate the author's (or site's) Authority. Therefore, calculations are reflective of the on-topic conversations, computed relative to the topic ecosystem being analyzed; if an author has written 200 posts, but only 5 are about the topic you're researching, the calculations will only leverage the 5 within the calculation. The result is that the user can set the context in order to identify authorities in relation to that context.

Figure 12:
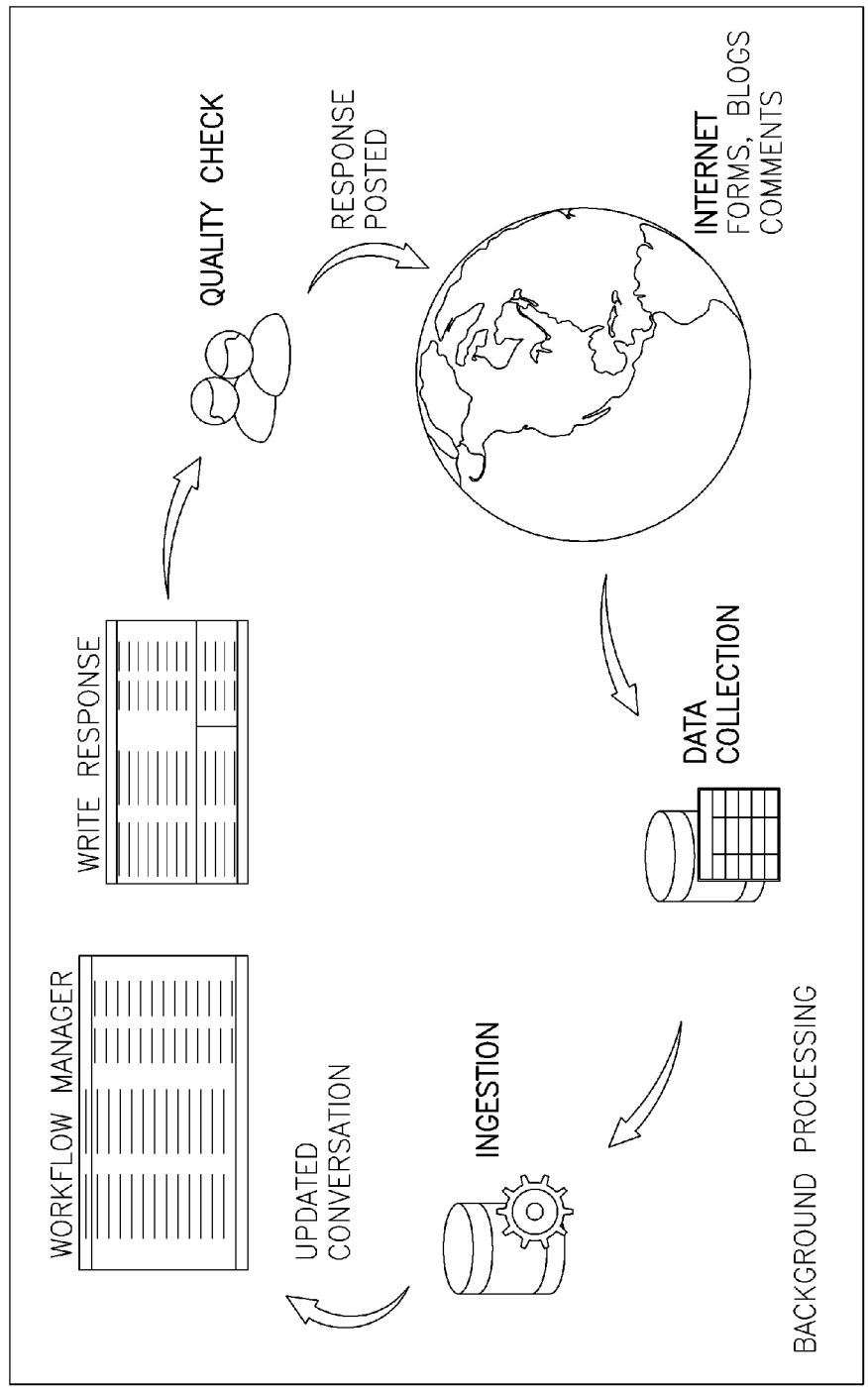
FIG. 12 is a depiction of one embodiment of a workflow as described herein.
Figure 14:
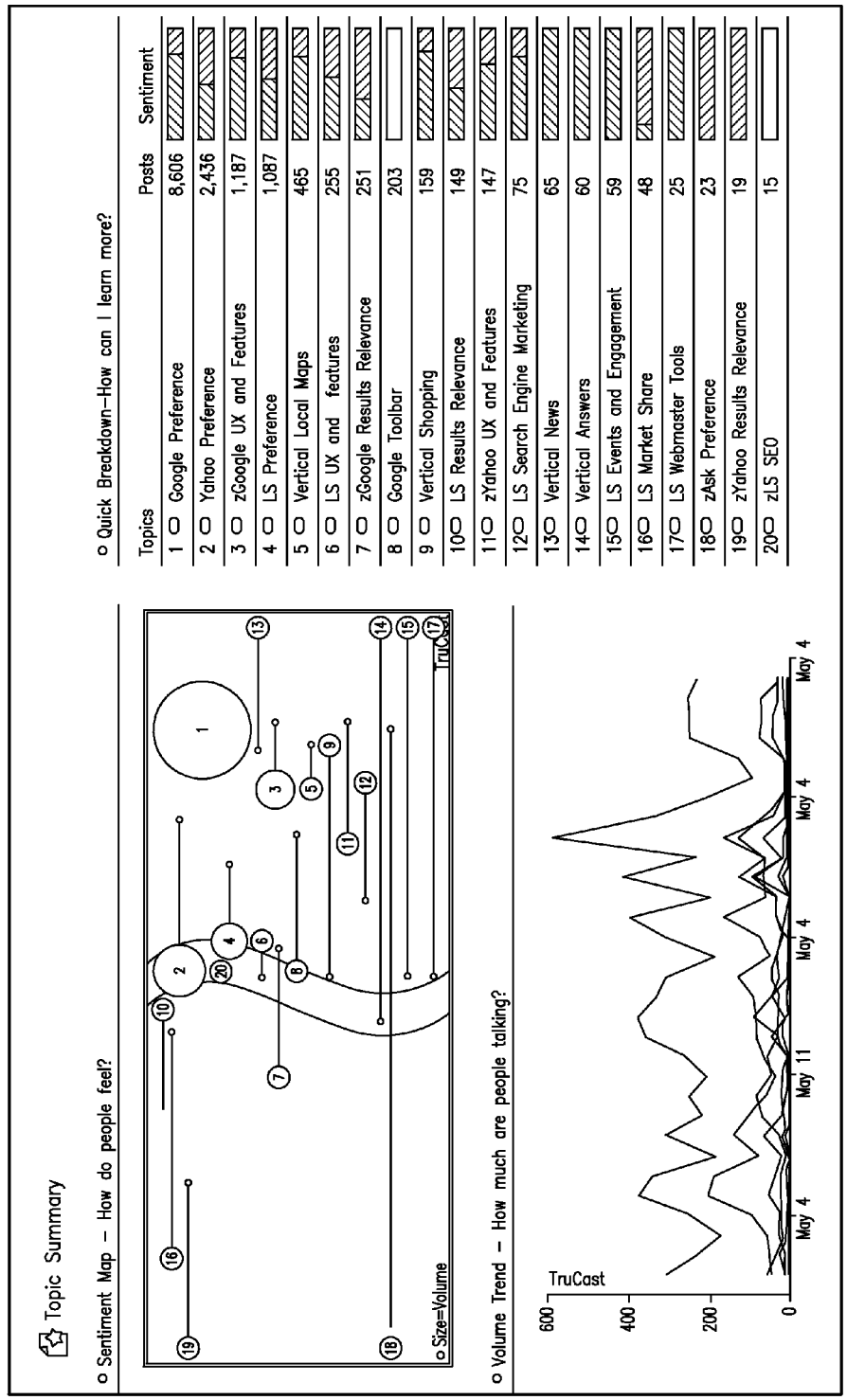
FIG. 14 shows a screenshot of topic summary dashboard with a sentiment map in one embodiment.

Referring now to FIG. 12, one embodiment of the system and method disclosed herein includes integration with business process and analytics. An Engagement Manager and/or Workflow Manager can be tailored to focus on the operational activities of identifying, engaging, and/or responding to actionable posts, as well as managing the interaction between the user and the authors providing content. In another embodiment, the Engagement Manager can manage a working group of users. For example, actionable posts can be allocated to certain users within the working group, thus directing the working group through the workspace based on the context and returned results. In one embodiment, batch actions relate to handling large amounts of similar data. For example, in situations where content volume is typically large, users can apply general rules that identify groups of posts for further action. For example, users can consider specific Site Domains as non-actionable; specific authors as owned relationships for one member of the working group; and/or tasks can be divided and distributed between individuals in a working group, for example, large numbers of posts can be moved to individual members for detailed review. For example, in operation a large group of posts can be assigned for individual line item review by a specific team member. To facilitate these actions, an administrator can be given the authority to select a number of posts so when a group of posts is selected, the administrator can preferably choose to bulk archive or bulk assign the selection. Alternative embodiments provide users with the same capability.

In another embodiment a Rules Manager permits assignment of one or more rules to one user. A user may manually analyze content by prioritizing rules that create groups of content. Users can analyze one or more groups of content based on their own individual specialties and roles. In this embodiment, a single user may create multiple rules to allow multiple groups of content to be independently segregated, sorted and presented to the user for analysis. The embodiment allows users to analyze content in the order of priority based on the current needs, and change that order when the need changes.

In this embodiment, the Rules Manager allows for the prioritization of the one or more rules, and further includes addition of selection parameters to further define the one or more rules. In this embodiment, the rules manager increases the speed of overall system responses by refreshing the UI upon any change or update to one or more rules. Additionally, the embodiment can display the number of posts the embodiment returns in applying any particular rule definition at the time the rule was created, and whenever that rule is created and/or saved. In this embodiment, the Rules Manager can also display the number of posts returned by changing the search criteria from requiring an exact match for search terms to permitting near matches for one or more of the criteria sections.

In one embodiment, the feature set of the Engagement Manager can include a search, folder structure, batch actions activities, activity details, and/or usability enhancements. For example, the search feature can allow users to search across their active and closed threads. This capability can be implemented to make optional "Responding Rules." The user can define and identify specific groups of posts that are actionable. In addition to search functionality, users can also save searches over time. Folder structure provides users with the identification of subsets of workable posts without needing to re-search. Unassigned posts can be viewed by individual topics, regardless of the user role. Administrators can see the current workstream of users by looking at individual user folders. Administrator approval and pass queues can have a folder so that the administrators can work through items that are targeted to them. Closed posts also can have a folder for quick access. Users can switch between different views, while also keeping the content separate based on different user scenarios.

User activities include the lifecycle of threads through the engagement process. User activities are actions performed by users on content, thus dealing with, by some response of the user, with the incoming results containing media. Users can perform as many activities as necessary to engage with, respond to, and/or gather responses from the community based on the content containing media. For example, wherein community response to user is context- and thread-dependent, the responses from user can likewise target the community audience in a context- and thread-dependent manner, and reactions to the user can be harvested from the community in a context- and thread-dependent manner. For example, user activities can include, but are not limited to, monitoring, and/or responsive media formats, responding via phone, IM, email, PM, post, or not responding, adding a note to thread, and the like. In addition, the system can record the user activities, for example, assigning action, archiving, marking as responded, marking as pending approval for later action, engaged in active conversation, and the like. In embodiments of the invention the user's activity can be decoupled from status of media content i.e. the stage at which a media content/post exists in the lifecycle.

In another embodiment, to support ongoing engagement, as well as transferring assignment of a specified content thread to different users (e.g., different users can be part of a working team, or corporate group), the system provides capabilities to capture information that is specific for the situation. Each user activity logged has an editable Title, Description and Outcome. Through this, users can capture information for themselves or others to read. User attached information can be attached to the content item so that the user engagement can be audited in the future and/or used for reference when reviewing a specific instance of communication. An outcome can be set as needed in any user activity. Although outcomes are available for any user activity, it is the engagement-specific activities that are the focus for setting this field. The outcome can be used, for example, to track how the community has responded to a given activity or a given user.

In another embodiment the Scoring Manager can have a Quality Control Interface to provide quality by efficient rescoring of content. For example, quality control can review scores by account and users to focus on trouble areas. In another exemplary embodiment the Quality Control Interface can change the score of the content item presented to the end user and/or client. In one embodiment, the Scoring Manager provides for the ability for excluding certain domains in scoring rules, thereby filtering the content which the scoring users must score.

In one embodiment the Business Rule application reduces and/or eliminates a significant delay in routing and presenting content to scorers. The Business Rules application can further provide a filter for Topics and can be configured to use rolling date range (e.g., set for "Last 30 days").

In an exemplary embodiment a static monitor results page can display an author name if the feed provides one. In addition filter controls can be used on such a page to filter for both Author and Site names.

In the list of posts, a Sentiment Indicator, in one exemplary embodiment, can be a roll up of the selected topics and sentiment. In the "details" view, the Sentiment Indicator is the same as in the "post" view/list. In the Topics panel for the "details" view, each sentiment can be indicated for all topics to which the post has been matched. All topic matches can be shown and therefore, does not have to be restricted by filter settings. In another embodiment, an Author Filter can provide exact match capability. A data export function call allow the user to export data.

In one embodiment a Dashboard header and navigation controls include navigation components that allow users to navigate more quickly to the modules of the Dashboard that they're most interested in. The Marketing and Topic menu items have drop-down menus allowing instant access to pages which previously were not directly accessible. In one embodiment the Dashboard Summary page provides an at-a-glance view of the accounts overall metrics with an emphasis on quick understanding of the most recent, most important data. The user can quickly and easily see and understand, in one embodiment, the following: sentiment for the selected period and the previous period; how their positive sentiment has changed between periods; volumes for the selected period and the previous period, and percentage of change (post volume, author volume, domain volume); the top most important authors (by volume) and whether their position in the top 10 has changed between periods; the top most important domains (by volume) and whether their position in the top 10 has changed between periods; links and descriptions for other key modules in the dashboards suite; and most recent refresh date/time (tells the user how up-to-date the data presented is). The new Topic Summary page provides a way to visualize how the user's topics compare with one another, including the ability to trend the sentiment of the chosen topics between periods. Sentiment Map allows the user to view the top 20 topics from their selection from a couple of perspectives. The information in this visualization is sentiment. Each 'orb' pictured represents a topic. The position of the orb against the red-to-green background represents that topic's sentiment, and the size of the orb represents that topic's post volume. In addition, there is a line and point for many of the topics which represents where the topic's sentiment was in the previous period. This provides the ability to trend topic-sentiment and understand whether it is moving and where. The user may hover over any of the orbs to obtain Topic Name and Post Volume data. Volume Trend allows the user to understand the post volume for the top 20 topics from their selection. Plotted against the selected timeline, each line represents a topic, and it's position from bottom to top indicates how much post volume is occurring in that topic. The user may hover over any of the data points on the lines to obtain Topic Name, Post Volume, and actual Date data. This module provides a legend of sorts, as well as another way to view the data for each of the other visualizations on the page. The first item, in one embodiment displayed is the rank number, which identifies the top 20 topics in your data set. The next item displayed is a color key, which matches to the orbs in the Sentiment Map and the lines in the Volume Trend. Next to this, the Topic Title is displayed. The user may click the Topic Title and be taken to the Topic Drill-through page for that topic. Next is the post count, by which the records are sorted. The topics with the most volume will be displayed first. Finally, a sentiment indicator is displayed, which shows how positive or negative each topic is. A marketing page includes as series of features: first, the queries which provide data to the charts and preferably run against the Data Mart instead of the Data Cube, causing great reductions in the runtimes of the queries. This leads to a greatly improved user experience as the modules tend to load significantly faster than they have in previous Dashboards versions. Users are able to search against and within content bodies in the Engagement Manager tool.

In one embodiment, Data Dashboard users may create a filter set, and then save that filter set for later use. This greatly reduces re-work required by our users in the Data Dashboard, and makes it easier for users to get to the data they're most interested in. Saved filters are visible by all users within a particular account. In one embodiment, when users view a permalink from within the Data Dashboard, they are able to copy that link and paste it into the 'Find by Link' panel in Data Browser with any success, due to the lack of 'http://' on the link. This feature upgrades the search within the Data Browser, such that the Find by Link feature intelligently appends the appropriate prefix so that the search is successful. Users are now much more easily able to find the permalinks they're interested in viewing in Data Browser.

In one embodiment the summary page provides an indication of the amount of neutral content for a particular view, both for previous period and current period. This allows a user to understand how widely distributed their sentiment is across all of their content. The business intelligence provided in the dashboards can be exported. This allows users to view their data in the ways that best suit them. In one embodiment, the scheduled export allows automation of the data retrieval process. With this feature, users will be able to set up an FTP client or alternatively use a browser, to download data exports in an automated fashion and without requiring the user to log into TruCast and use the user interface to obtain their data. The Dashboard further optionally includes a method of filtering and targeting Business Intelligence, such as filtering results by country. Included in this feature are both the main Dashboards pages as well as the Data Dashboard. In one embodiment, a countries page allows users to view their contents' distribution across the globe, from both sentiment and volume perspectives. In addition, a detailed grid provides next-level analytics broken out by country. Using this feature, a user will be able to identify areas of both concern and opportunity. This page further may include a save to PDF feature. Along with the new Country filter capabilities and new page, country values may be included with Scheduled Data Exports as well as the On-Demand exports from the Data Dashboard. In one embodiment, users can adjust their schedule to changing business needs easily from the same interface. In one embodiment, the ability to filter by Domain in the filter controls is included. Users are able to further target the data fetched by the Data Dashboard and get the data which is most important to them.

In another embodiment the invention includes a user interface wherein a variety of information can be displayed at any given time, giving users a 'quick view' of information of particular interest. Included is a zoom feature for many of the charts displayed in the Dashboards. As illustrated in FIGS. 13-18, various screenshots are shown having various dashboards. In one embodiment a Data Dashboard allows users to create focused content searches, helping them to target the content they're most interested in. In one embodiment, the ability to Save and Load, is included to for filters. A user can create targeted searches, and then save them for later use. A user may load the filters previously saved. A user may also take a 'snap shot' of their view and save it as a .PDF file. This file can then be attached to an email making it easy for the user to share it with their colleagues.

In another embodiment the invention includes a user interface wherein a variety of information can be displayed at any given time, giving users a 'quick view' of information of particular interest. Included is a zoom feature for many of the charts displayed in the Dashboards. This Dashboard feature extends to line, scatter, summary, and pie charts in the Dashboard display. The invention can provide many date ranges by which the user can limit the data in the view and can improve the date range system by introducing a new custom date range builder. Using this feature, users can select a customized window of time by which to filter their view. This allows a user to filter and organize their data according to their specific needs.

In another embodiment business intelligence includes a Data dashboard that can allow users to see the individual posts that go into the aggregate data points in the dashboards, providing metadata about the content, as well as a link to see the actual post on the web. Control to the list of data that is shown is provided to the user, allowing the user to filer the information by selected parameters, for example but not limited to, author, date, sentiment, topic.

In one embodiment, business intelligence includes an Authors dashboard presenting a view of the account data with authors as the central area of focus. The Authors dashboard can include, for example: a summary, for example, the number of authors for the chosen period, last period of same duration, same period from last year, and yesterday and for the following categories: total authors, authors writing original posts and authors starting a conversation.

In an exemplary embodiment the Authors dashboard can include a list of the top authors based on the measurements such as: activity, (rank based on content volume), pull (rank based on author interaction on ranked authors original posts), reach (rank based on author interaction on ranked author's comments), participation (rank based on comment volume), authorship (rank based on original post volume) influence (rank based on a weighted metric involving activity reach and pull), and/or topics (for each of the chosen topics of interest, this can show the number of authors for the chosen period, last period of same duration, and same period last year).

In one embodiment, business intelligence includes a Network Sites dashboard (marketing/sites) that can present a view of the account data with network sites as a central area of focus. The network sites dashboard can include, for example a summary, for example, the number of sites for the chosen period, last period of same duration, same period from last year, and the past day for the following categories: total sites, sites containing original posts, and sites containing a conversation. In an exemplary embodiment the Network Sites dashboard can include metrics such as: relevant volume (the determined relevant site volume trend obtained after the categorization and sentiment scoring processes have taken place), top sites (the top 10 sites based on the measurements such as: content, conversations, authors), and/or topics (for each of the chosen topics of interest, this can show the number of sites for the chosen period, last period of same duration and same period from last year).

In an exemplary embodiment, data export function is available through the Summary and Marketing Dashboard Tabs allowing the user to export the X-Y data points from charts represented as images. This allows the user to create their own custom charts as well as grab the data points behind the chart rendering for further analysis. Export capabilities can be indicated by an export icon.

In other embodiments of the invention a Scoring Manager included in the business intelligence dashboards includes filtering feature that ensures that the user is presented with relevant and useful content, i.e., users can focus on posts and content which are particularly important, because unwanted content is filtered from view. In addition, in a rule management feature, users can view the number of pieces of content that are available under the current rule's definition, which allows for near real time management of the scoring process to help ensure efficient work allocation.

In other embodiments of the invention an Engagement Manager included in the business intelligence dashboards provides users with an interface to visualize the number of posts in each thread represented in their view by providing a small counter of posts for each thread. This feature can allow the user to make a decision on which threads to respond to based on the number of posts found therein. A data browser is included that can allow users to view a batch of unscored data, e.g., the last 30 days of unscored data for their account, as well as the ability to easily sort that data, and navigate the pages of data. In addition to providing a new way to browse through unscored data, the Data Browser allows the user to enter and search for particular exact match permalinks, regardless of topic matching. Using the data browser, users can locate threads of interest and the importance of the threads based on permalink searching, and then score these important items, bringing them into Engagement Manager.

The response manage includes a rescore which provide users with the ability to re-score a post even if that post has not been previously scored. This improves the workflow experience, and provides users with a streamlined way to score posts in the Response Manager. The engagement manager and the engagement manager user interface provide users with the ability to quickly and easily see the number of posts in each thread represented in their view by providing a small counter of posts for each thread. This allows the user to make quick decisions on which threads they'd like to respond to based on the amount of posts found therein. A data browser is included that allows users to quickly and easily view the last 30 days of unscored data for their account, as well as the ability to easily sort that data, and easily navigate the pages of data. In addition to providing a new way to browse through unscored data, the Data Browser allows the user to enter and search for particular exact match permalinks, regardless of topic matching. Using this feature, users can quickly locate threads of interest and importance via permalink searching, and then quickly and seamlessly score these important items, bringing them into Engagement Manager. Business intelligence includes Business Intelligence Dashboards, there is a variety of information displayed at any given time, giving users a 'quick view' of information they're interested in. To further enhance this experience included is a zoom feature for many of the charts displayed in the Dashboards. By clicking on the zoom icon for a particular chart, the user will be provided with an enhanced and enlarged view of that chart, allowing a user to more closely analyze the data contained in that chart. This improvement to the Dashboards extends to line, scatter, summary, and pie charts in the Dashboard display. As a part of the Business Intelligence Dashboards, the TruCast system provides many date ranges by which the user can limit the data in their view. As a part of one embodiment of the invention, the Dashboards can improve that date range system by introducing a new custom date range builder. Using this feature, users can select a customized window of time by which to filter their view. This advantageously allows a user to filter and massage their data to their specific needs. Business Intelligence has applied new logic which will allow further refinement and distillation of the content displayed in the Dashboards and EcoSystems. These enhancements apply logic to many of the calculations which drive the Dashboards and EcoSystems displays, and provide for clean data. The engine includes providing unrelated data information into the Data Warehouse, which provides that information to many downstream consuming systems. This unrelated information provides the ability for the Dashboards to effectively communicate to users the comparison of relevant to irrelevant data being provided by the system.

Figure 13:
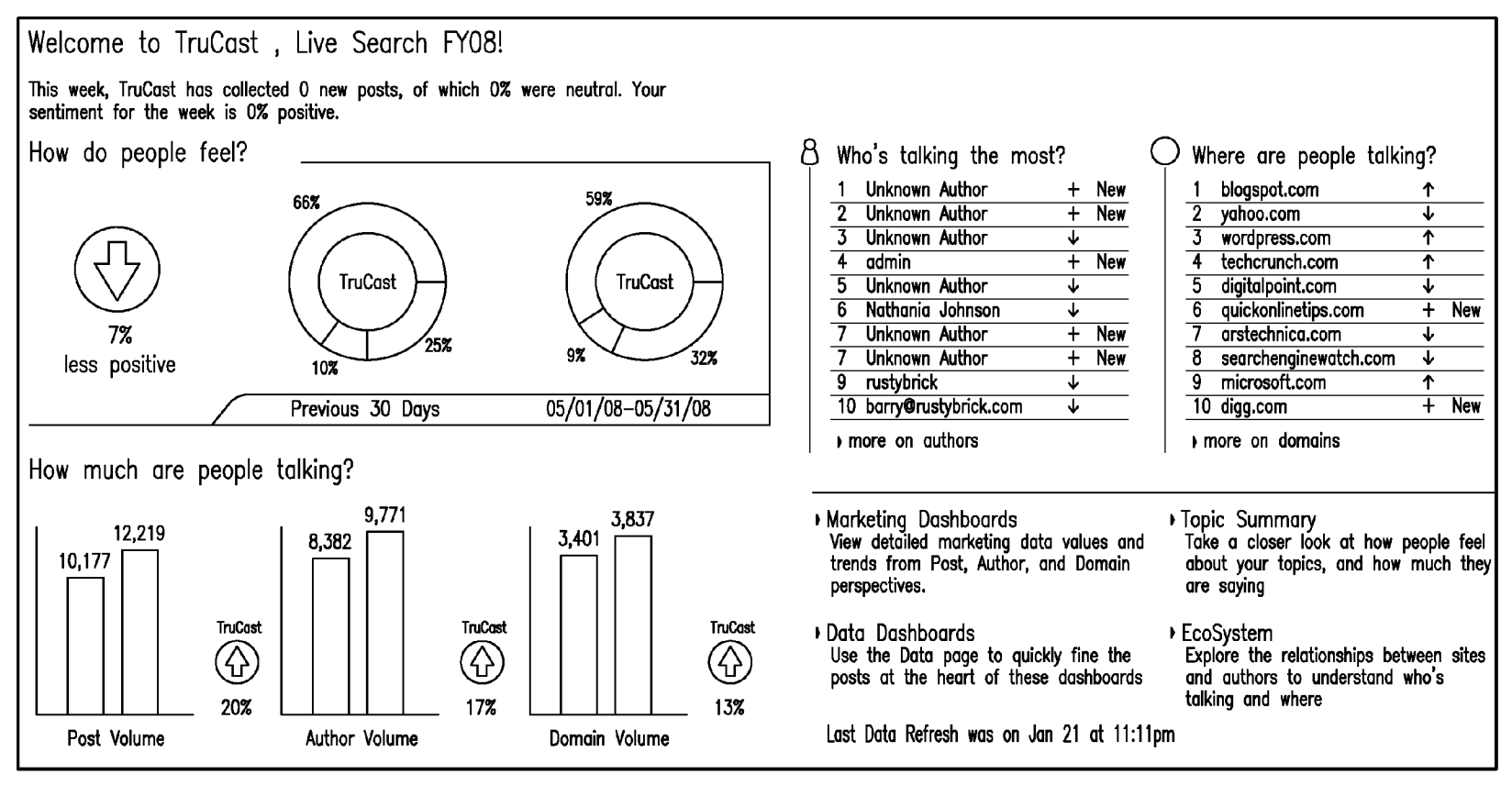

In one embodiment, referring to FIG. 13, business intelligence includes a summary dashboard. In this embodiment, the summary dashboard can contain a high level view of one or more user's account. It can contain less detail than an individual marketing dashboard item and can represent an overall picture of the user account data. The summary dashboard, for example, can include post volume wherein the user can see the number of pieces of content for the chosen date range (e.g., past seven days), the last period of the same duration (e.g., last week), and the same period one year ago.

In an exemplary embodiment the summary dashboard can include network site volume which can show, e.g., the number of sites that have content for the chosen date range, the last period of same duration, and the same period one year ago. In an exemplary embodiment the summary dashboard can include the author volume showing the number of authors that wrote content for the chosen date range, the last period of same duration, and the same period one year ago. In an exemplary embodiment the summary dashboard can include incoming content showing the content related to specific topics coming into system across, e.g., the last week of posted dates. In yet another exemplary embodiment the summary dashboard can include current sentiment showing the distribution of sentiment for content on specific topics. In an exemplary embodiment the summary dashboard can include a topic summary showing a quick view of the topics with one or more of a sentiment meter, a post count and a percentage of posts with a given sentiment (e.g., neutral) for the given period and selected topics of interest. In an exemplary embodiment the summary dashboard can include volume trend showing the trend of content, sites and author volumes over the date range chosen. In an exemplary embodiment the summary dashboard can include top authors based one or more measurements such as activity, pull, reach, participation, authorship, or influence. In an exemplary embodiment the summary dashboard can include top sites based on measurements such as content, conversations, and authors.

Figure 15:
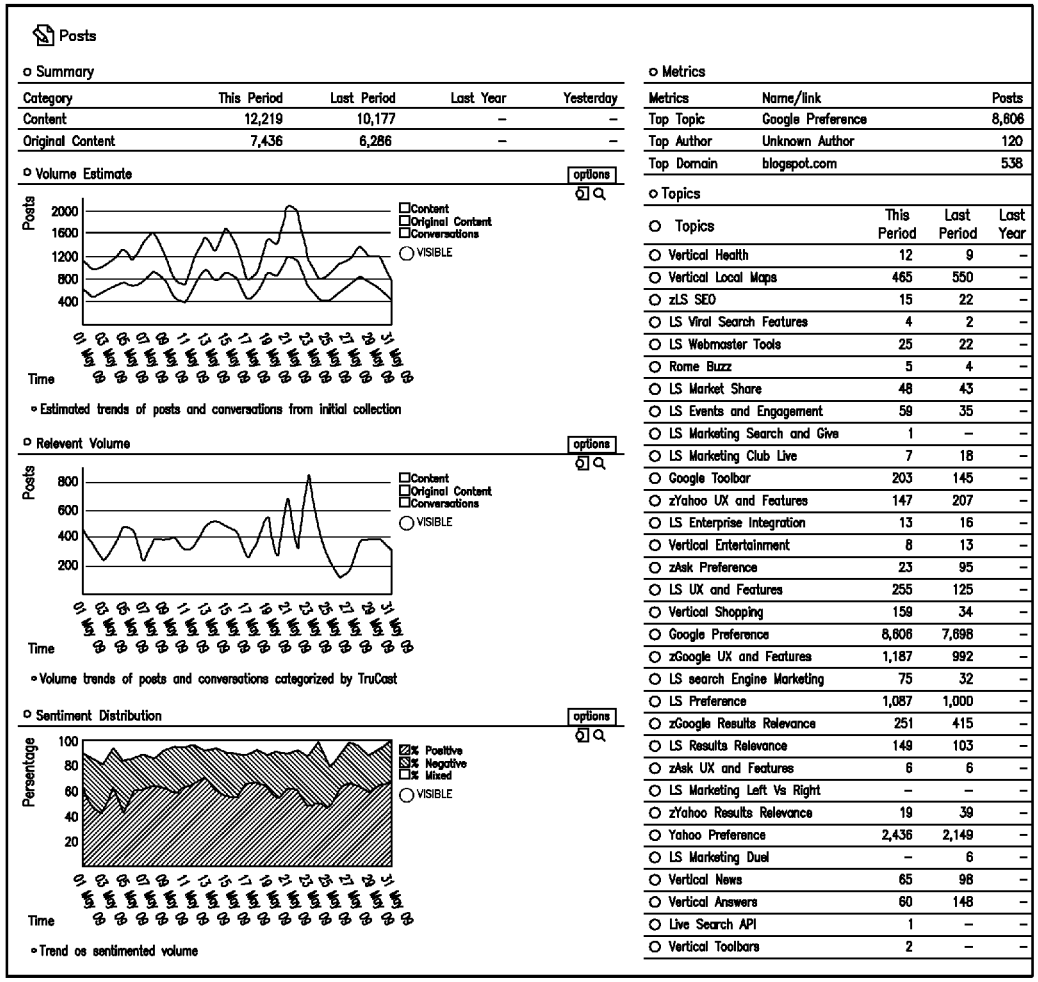
FIG. 15 shows a screenshot of a post dashboard in one embodiment.
Figure 16:
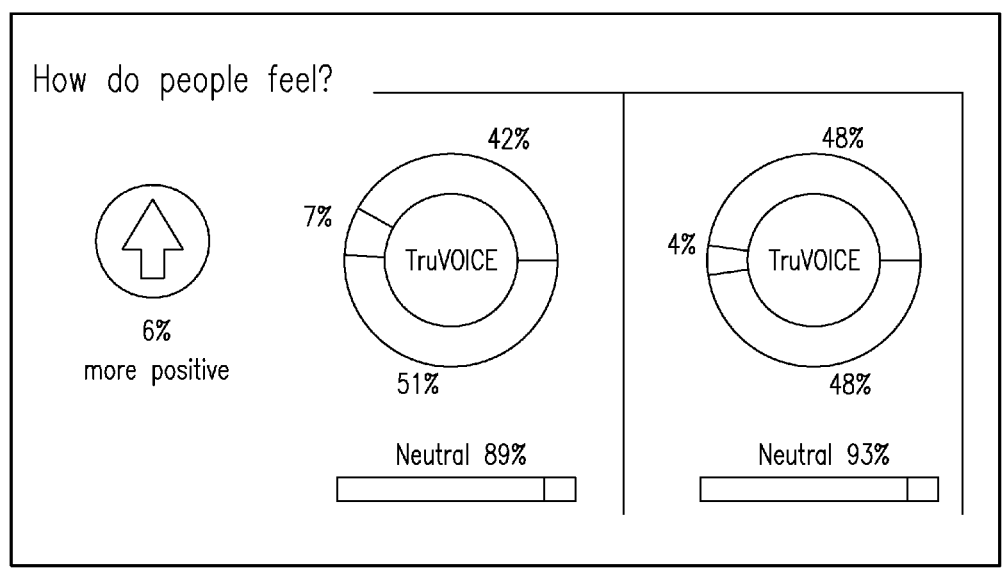
FIG. 16 shows a screenshot of a sentiment overview in one embodiment.
Figure 18:
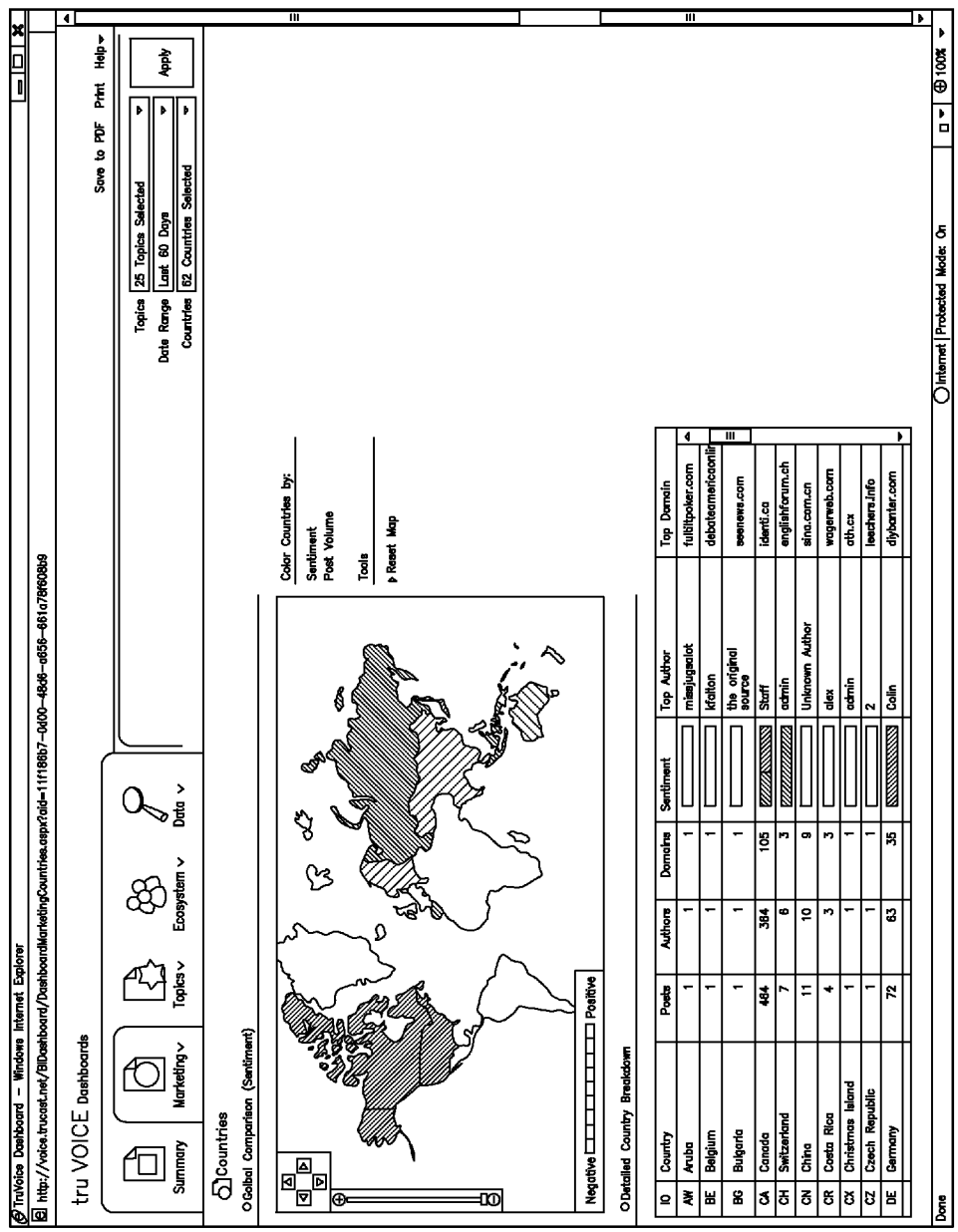
FIG. 18 shows a screenshot of a countries overview in one embodiment.

In one embodiment, referring to FIG. 15, business intelligence includes a marketing/posts dashboard which can present a view of the account data with posts as the central area of focus. The Marketing/post dashboard can include, for example, a summary wherein the number of pieces of content for the chosen period, number of pieces for the last period of same duration, number of pieces for the same period from last year, and number of pieces from yesterday for the different categories are displayed, wherein the different categories include: total content, original posts, and or conversations or number of threads. In an exemplary embodiment the Marketing/post dashboard can include volume estimates, for example, an estimated volume trend based on keyword matching that measures the number of content in the following categories: total content, original posts, conversations, or number of thread. In an exemplary embodiment the Marketing/post dashboard can include relevant volume for example, the determined relevant volume trend obtained after the categorization and sentiment scoring processes have taken place in the following categories: total content, original posts, conversations, or number of threads. In an exemplary embodiment the Marketing/post dashboard can include sentiment distribution, for example, for topics chosen in the filter, this graph can show the distribution of positive, negative, and mixed from the portion of relevant posts that contain sentiment. The sentiment distribution can be measured, for example, as percentage scale to ensure clarity that can be masked from topic-post amplification. In an exemplary embodiment the Marketing/post dashboard can include metrics, for example, statistics of content includes top sites, top author, top topic and top thread. In an exemplary embodiment the Marketing/post dashboard can include topics metrics, for example for each of the chosen topics of interest, the number of pieces of content for the chosen period, last period of same duration, and same period from last year as well as a roll-up view of the sentiment that uses the same algorithm used for rolling up sentiment in the ecosystem map can be shown.

In one embodiment, business intelligence includes a Topic Drill Down (marketing/topic drilldown) dashboard that can present a view of the data, arranged to represent a topic-centric perspective. The topic drill down dashboard can include, for example, a topic summary wherein the summary volume for a specific topic displays content, sites and authors for this period, last period of same duration and same period from last year. In an exemplary embodiment the Topic Drill Down dashboard can include topic comparison, for example a chart showing an overview of the chosen topic in relation to the rest of the currently active topics. In an exemplary embodiment the Topic Drill Down dashboard can include topic sentiment trend showing the volume of sentimented posts over time, broken down by positive, negative and mixed. In an exemplary embodiment the Topic Drill Down dashboard can include topic volume trend showing the volume for the topic trended over time for content, sites and authors. In an exemplary embodiment the Topic Drill Down dashboard can include topic metrics showing statistics including top site, top author and/or top thread. In an exemplary embodiment the Topic Drill Down dashboard can include topic sentiment summary including an overall sentiment summary for the topic showing: neutral vs. sentimented, breakdown of sentiment on positive, negative and mixed. In an exemplary embodiment the Topic Drill Down dashboard can include topic comparisons wherein a summary of all topics showing content volume for the chosen period, last period of same duration, and same period from last year is displayed.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for monitoring consumer-generated media, implemented on at least one computer having a display, comprising:
   discovering consumer generated media using a plurality of keywords from a set of keywords configured to return consumer generated media embedded in a digital location;
   collecting consumer generated media. from a plurality of sources using a plurality of robots configured to collect media from the discovered consumer generated media;
   determining a sentiment of the collected consumer generated media based on the semantics of the language in the collected consumer generated media;
   generating a graphical user interface illustrating the determined sentiment for a selected time period and the determined sentiment for a time period previous to the selected time period, wherein the determined sentiment comprises at least one of a good, bad, neutral and good/bad sentiment value;
   displaying the graphical user interface on the display;
   identifying a specific consumer generated media to which a reply should be posted;
   in response to identifying the specific consumer generated media, automatedly posting to a source of the collected consumer generated media a first reply to the identified consumer generated media;
   collecting a consumer-generated response to the at automatedly posted first reply; and automatedly posting to the source of the collected consumer generated media a second reply based on the consumer-generated response to the automatedly posted first reply.

2. The method of claim 1, wherein the graphical user interface further illustrates an amount of change in positive sentiment between the selected time period and the previous time period.

3. The method of claim 1, wherein the graphical user interface further illustrates at least one volume associated with the selected time period and the previous time period.

4. The method of claim 3, wherein the at least one volume comprises at least one of a post volume, an author volume, and domain volume.

5. The method of claim 1, wherein the graphical user interface further comprises filtering consumer generated media based on predetermined content settings.

6. The method of claim 1, wherein the graphical user interface further comprises determining the country of origin of the consumer generated media and displaying in the graphical user interface the country of origin of the consumer generated media.

7. The method of claim 1, further comprising filtering the consumer generated media by consumer generated media source.

8. The method of claim 1, further comprising sending an alert when triggered by a predetermined event.

9. The method of claim 1, further comprising generating a statistical report based on the collected consumer generated media and distributing the report electronically.

10. The method of claim 1, further comprising generating a data file available for external systems to access and consume the conceptually relevant and sentiment attributed consumer generated media.

11. A system for monitoring consumer generated. media, comprising;
a first database configured to store at least one collected consumer generated media post;
a second database configured to store sentiment data, the sentiment data used to analyze a sentence and determine a sentiment;
a display; and
a processor in data communication with the display and with the database, the processor comprising:
at least one component configured to discover consumer generated media using a plurality of keywords from a set of keywords configured to return consumer generated media embedded in a digital location;
at least one component configured to collect consumer generated media from a plurality of sources using a plurality of robots configured to collect media from the discovered consumer generated media;
at least one component configured to determine a sentiment of the collected consumer generated media based on the semantics of the language in the collected consumer generated media;
at least one component configured to generate a graphical user interface illustrating the determined sentiment for a selected time period and the determined sentiment for a time period previous to the selected, time period, wherein the determined sentiment comprises at least one of a good, bad, neutral. and good/bad sentiment value;
at least one component configured to display the graphical user interface on the display;
at least one robot component configured to register with a source of the collected consumer generated media;
at least one component configured to automatedly post, after the at least one robot component has registered with the source of the collected consumer generated media, to the source of the collected consumer generated media a first reply to at least one of the consumer generated media;
at least one component configured to collect a consumer-generated response to the automatedly posted first reply; and
at least one component configured to automatedly post to the source of the collected consumer generated media a second reply based on the consumer-generated response to the automatedly posted first reply.

12. The system of claim 11, wherein the graphical user interface further illustrates an amount of change in positive sentiment between the selected time period and the previous time period, 13. The system of claim 11, wherein the graphical user interface further illustrates at least one volume associated with the selected time period and the previous time period.

14. The system of claim 1, wherein the graphical user interface further comprises a component configured to filter consumer generated media based on predetermined content settings.

15. The system of claim 1, wherein the graphical user interface further comprises a component configured to determine the country of origin of the consumer generated media and displaying in the graphical user interface the country of origin of the consumer generated media.

16. The system of claim 14, further comprising a component configured to generate a statistical report based on the collected consumer generated media and distributing the report electronically.

17. The system of claim 15, further comprising a component configured to generate a data file available for external systems to access and consume the conceptually relevant and sentiment attributed consumer generated media.

18. A method for monitoring consumer generated media, implemented on at least one computer having a display, comprising:
discovering consumer generated media using a plurality of keywords from a set of keywords configured to return consumer generated media embedded in a digital location;
collecting consumer generated media from a plurality of sources using a plurality of robots configured to collect media from the discovered consumer generated media;
determining a sentiment of the collected consumer generated media based on the semantics of the language in the collected consumer generated media;
generating a graphical user interface illustrating the determined sentiment for a selected time period and the determined sentiment for a time period previous to the selected time period, wherein the determined sentiment comprises at least one of a good, bad, neutral and good/bad sentiment value;
displaying the graphical user interface on the display;
identifying a specific consumer generated media to which a reply should be posted;
in response to identifying the specific consumer generated media, automatedly posting to a source of the collected consumer generated media a first reply to the identified consumer generated media;
collecting consumer-generated text in response to the automatedly posted first reply; and automatedly posting to the source of the collected consumer generated media a second reply based on the consumer-generated response to the automatedly posted first reply.

\* \* \* \* \*